United States Patent
Bjorstrom et al.

(10) Patent No.: US 7,542,240 B1
(45) Date of Patent: Jun. 2, 2009

(54) VERTICALLY ENGAGING SNAP-ON ARM MOUNTS FOR DISK DRIVE HEAD SUSPENSIONS

(75) Inventors: Jacob D. Bjorstrom, Hutchinson, MN (US); Wade A. Linnertz, Chaska, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 682 days.

(21) Appl. No.: 11/025,999

(22) Filed: Dec. 30, 2004

Related U.S. Application Data

(60) Provisional application No. 60/533,106, filed on Dec. 30, 2003.

(51) Int. Cl.
*G11B 5/48* (2006.01)

(52) U.S. Cl. .................. 360/244.5; 360/265.9

(58) Field of Classification Search .............. 360/244.2, 360/344.3, 244.4, 244.5, 244.6, 244.8, 244.9, 360/245, 245.1, 245.2, 265.9, 266, 266.7, 360/266.1
See application file for complete search history.

(56) References Cited

U.S. PATENT DOCUMENTS

| | | | |
|---|---|---|---|
| 4,943,875 A * | 7/1990 | Reidenbach et al. ..... | 360/245.2 |
| 4,947,275 A | 8/1990 | Hinlein | |
| 5,185,683 A * | 2/1993 | Oberg et al. ............. | 360/244.6 |
| 5,198,945 A | 3/1993 | Blaeser et al. | |
| 5,296,984 A * | 3/1994 | Fick ........................ | 360/244.5 |
| 5,313,355 A | 5/1994 | Hagen | |
| 5,355,267 A * | 10/1994 | Aoyagi et al. ............ | 360/244.5 |
| 5,731,932 A * | 3/1998 | Crane ...................... | 360/244.5 |
| 5,781,380 A | 7/1998 | Berding et al. | |
| 5,946,164 A | 8/1999 | Tracy | |
| 6,061,896 A * | 5/2000 | Tracy ...................... | 29/603.03 |
| 6,166,886 A * | 12/2000 | Toensing ................. | 360/244.5 |
| 6,191,921 B1 | 2/2001 | Hanrahan et al. | |
| 6,324,130 B1 | 11/2001 | Hatam-Tabrizi et al. | |
| 6,392,844 B1 * | 5/2002 | Summers ................. | 360/245.5 |
| 6,407,888 B1 | 6/2002 | Crane | |
| 6,417,993 B1 | 7/2002 | Kant et al. | |
| 7,024,754 B1 * | 4/2006 | Crowder et al. .......... | 29/603.03 |
| 7,466,518 B1 * | 12/2008 | Bjorstrom et al. ........ | 360/244.5 |
| 7,471,488 B1 * | 12/2008 | Zhang ..................... | 360/244.5 |

FOREIGN PATENT DOCUMENTS

| | | | |
|---|---|---|---|
| JP | 9073745 A | | 3/1997 |
| JP | 09306112 | | 11/1997 |
| JP | 10152530 | | 6/1998 |
| JP | 10162517 | | 6/1998 |
| JP | 10162530 A | * | 6/1998 |

* cited by examiner

*Primary Examiner*—Brian E Miller
(74) *Attorney, Agent, or Firm*—Faegre & Benson LLP

(57) ABSTRACT

Mounts for securing magnetic disk drive head suspensions to actuator arms. The mounts include structures that snap onto the actuator arm to provide a secure friction fit engagement. The mounts can be efficiently removed to permit rework of the suspension and head components.

7 Claims, 32 Drawing Sheets

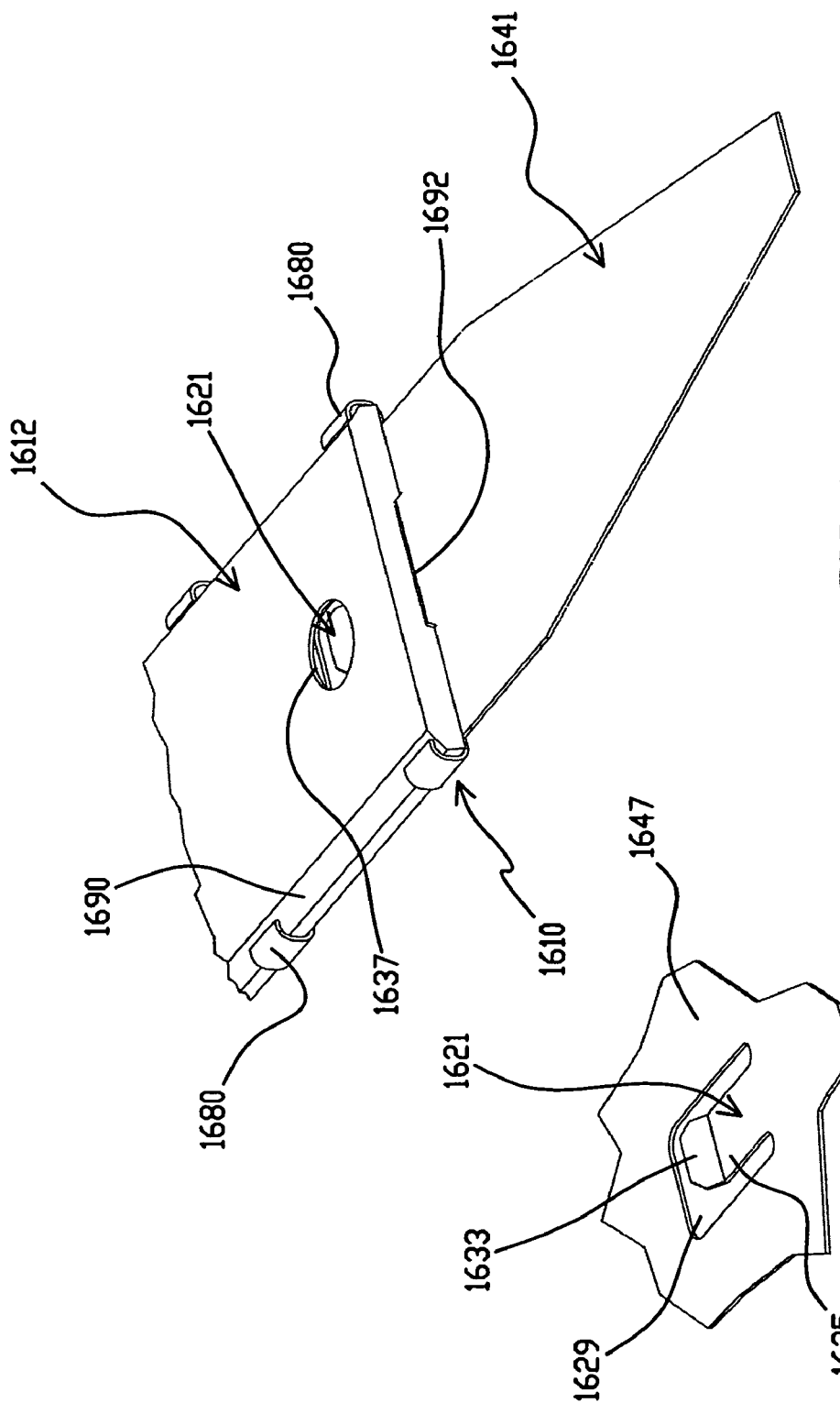

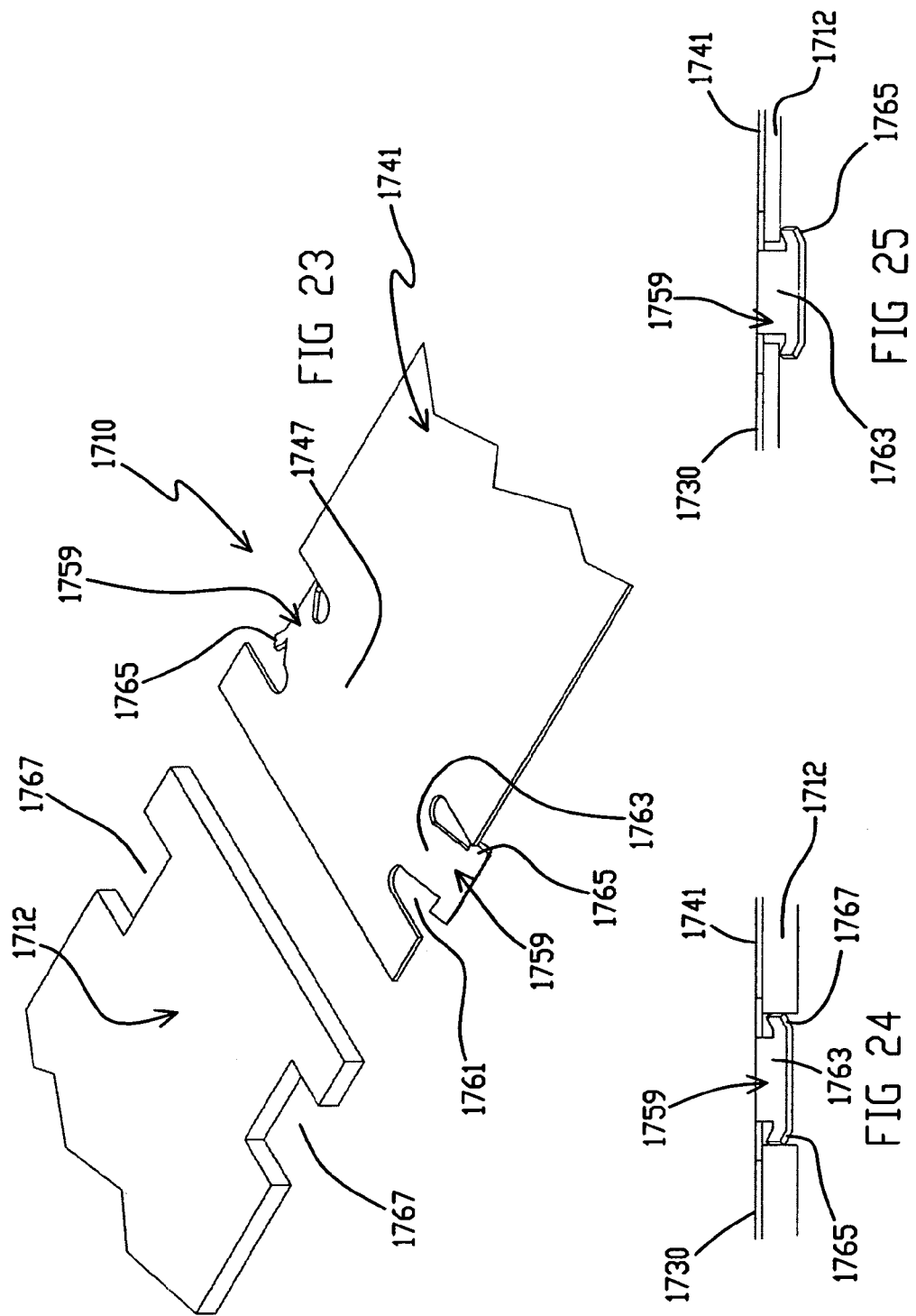

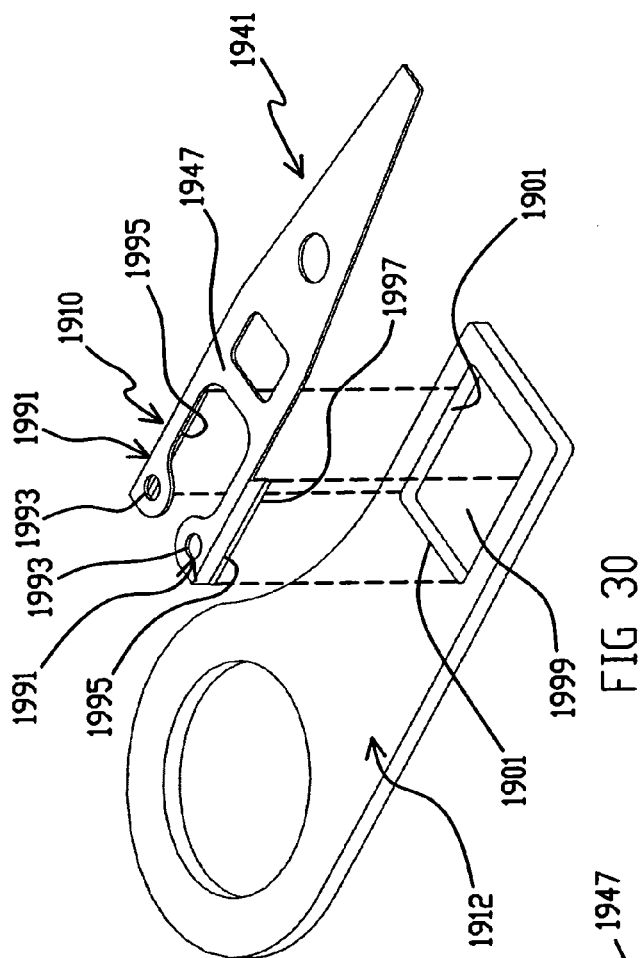
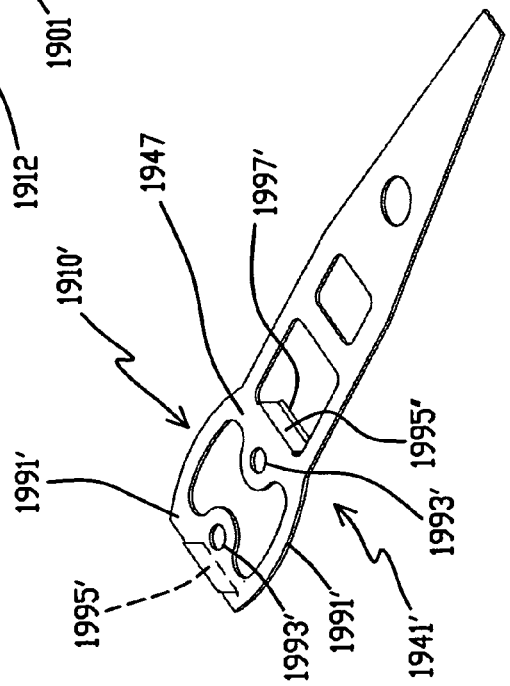
FIG 30
FIG 31

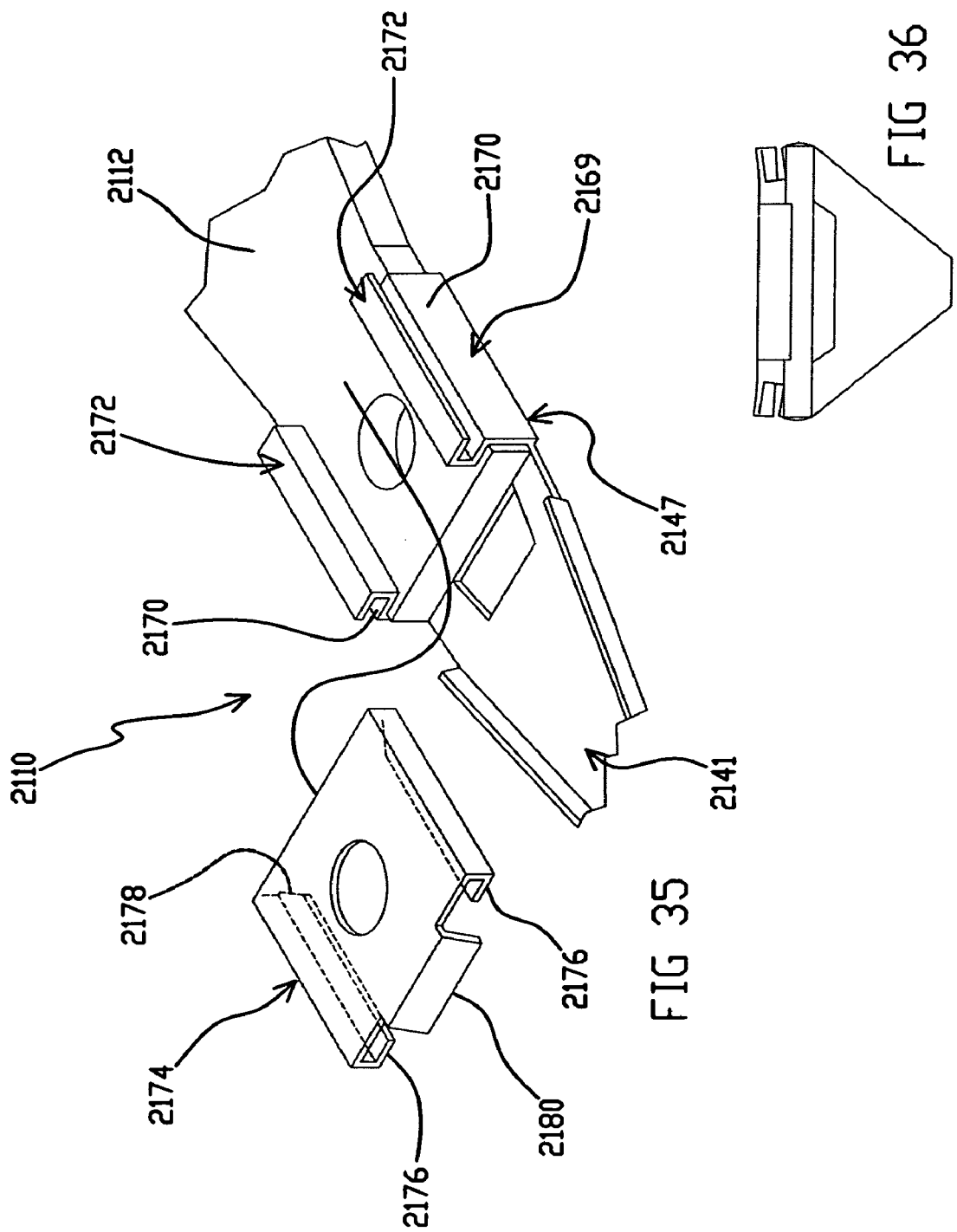

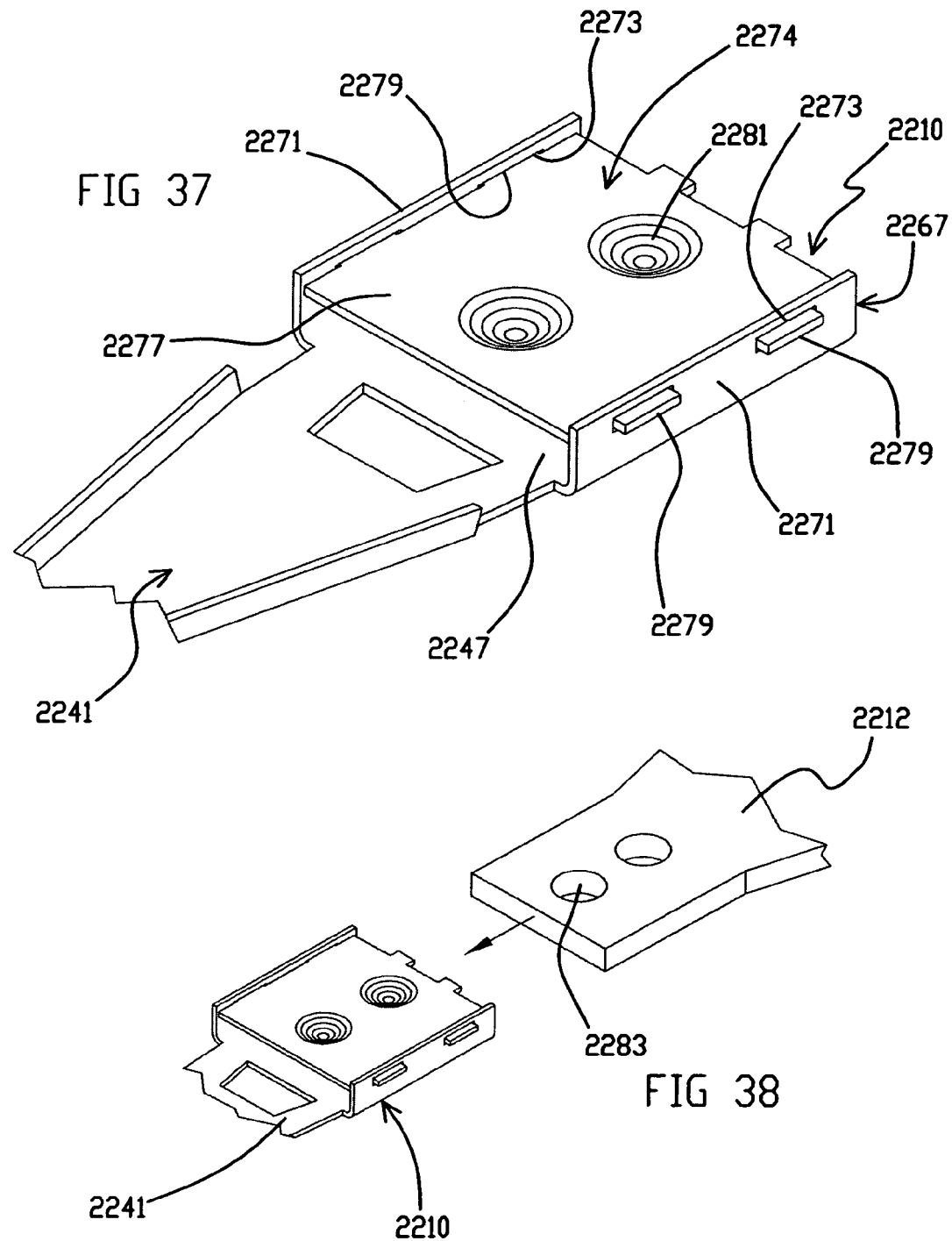

VERTICALLY ENGAGING SNAP-ON ARM MOUNTS FOR DISK DRIVE HEAD SUSPENSIONS

REFERENCE TO RELATED APPLICATION

This application claims the benefit of U.S. Provisional Application No. 60/533,106, filed Dec. 30, 2003 and entitled Snap-On Suspension, which is hereby incorporated by reference in its entirety.

FIELD OF THE INVENTION

The invention relates generally to magnetic disk drive head suspensions. In particular, the invention is a head suspension or suspension component having a mounting structure that snaps on to E-block or other actuator structure.

BACKGROUND OF THE INVENTION

Magnetic disk drive head suspensions typically have a mounting region that is attached to an E-block or other actuator structure in a disk drive. Known attachment structures and related methods are disclosed, for example, in the following U.S. patents.

| Inventor Name | Pat. No. |
| --- | --- |
| Reidenbach, et al. | 4,943,875 |
| Hinlein | 4,947,275 |
| Blaeser, et al. | 5,198,945 |
| Hagen | 5,313,355 |
| Tracy | 5,946,164 |
| Hanrahan, et al. | 6,191,921 |

There remains, however, a continuing need for improved structures and methods for mounting suspensions to actuator structures. Any such structures and methods must be capable of securely mounting the suspensions to the actuators. Structures and methods that enable the suspension to be removed and reassembled (i.e., reworked) would be especially desirable. To be commercially viable, any such structure and method should be efficient to fabricate and perform.

SUMMARY OF THE INVENTION

The invention is a mount for securing magnetic disk drive head suspensions to actuator arms. The mount includes structures that snap onto the actuator arm to provide a secure friction fit engagement. The mounts can be efficiently removed to permit rework of the suspension and head components. They are also efficient to manufacture.

BRIEF DESCRIPTION OF THE DRAWINGS

FIG. 21 is an illustration of a load beam having a snap-on mount with curved tabs and a spring tab in accordance with another embodiment of the invention, and a proximal portion of an actuator arm to which the mount can be attached.

FIG. 22 is a detailed illustration of the spring tab shown in FIG. 21.

FIG. 23 is an illustration of a load beam having a snap-on mount with shouldered tabs in accordance with another embodiment of the invention, and a proximal portion of an actuator arm to which the mount can be attached.

FIG. 24 is a detailed illustration of the load beam tab and slot shown in FIG. 23 in an edge-engaged mounted position.

FIG. 25 is a detailed illustration of the load beam tab and slot shown in FIG. 23 in a surface-engaged mounted position.

FIG. 30 is an illustration of a load beam having a snap-on mount with spring tabs in accordance with another embodiment of the invention, and an actuator arm to which the mount can be attached.

FIG. 31 is an illustration of another embodiment of the load beam and snap-on mount shown in FIG. 30.

FIG. 35 is an illustration of a clip snap-on mount in accordance with another embodiment of the invention, attached to an actuator arm.

FIG. 36 is an end view of the assembled mount shown in FIG. 35.

FIG. 37 is an illustration of a clip snap-on mount in accordance with another embodiment of the invention.

FIG. 38 is an illustration of the mount shown in FIG. 37 and an actuator arm to which the mount can be engaged.

DETAILED DESCRIPTION OF THE PREFERRED EMBODIMENTS

Figure 1:
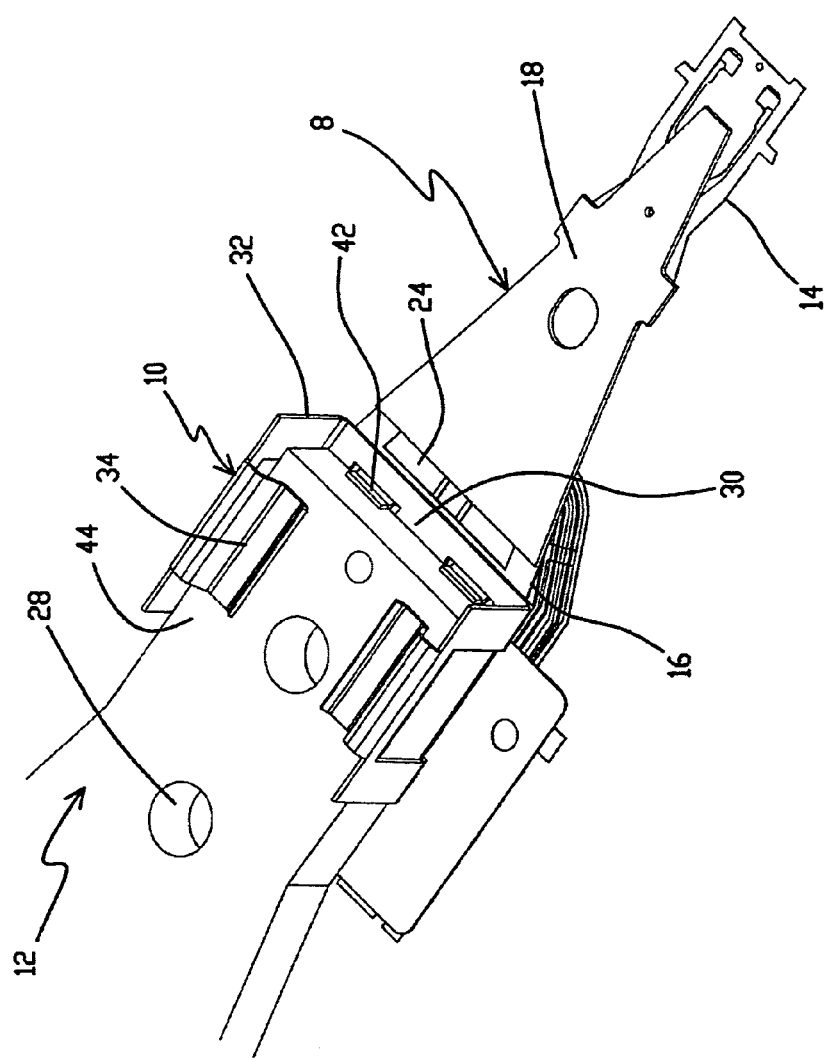
FIG. 1 is an illustration of a disk drive head suspension having a snap-on mount in accordance with one embodiment of the present invention mounted to an actuator arm.

FIG. 1 is an illustration of a disk drive head suspension 8 having a spring clip or snap-on mount 10 in accordance with one embodiment of the present invention mounted to an actuator arm 12. With the exception of snap-on mount 10, suspension 8 can be of a conventional or otherwise known design. In the illustrated embodiment, for example, and as perhaps best shown in FIG. 2, the suspension 8 is a 4-piece member including an integrated lead or wireless flexure 14, hinge member 16, load beam stiffener 18 and the snap-on mount 10. Hinge member 16 includes a proximal or arm mounting region 20, a distal or load beam stiffener mounting region 22 and a radius or spring region 24. A proximal portion of the load beam stiffener 18 is welded or otherwise attached to the load beam stiffener mounting region 22 of the hinge member 16. The flexure 14 is welded or otherwise attached to the load beam stiffener 18 and the arm mounting region 20 of the hinge member 16. A lead portion 26 of the flexure 14 extends across the spring region 24 of the hinge member 16. Conventional or otherwise known methods can be used to manufacture the suspension 8. Snap-on mount 10 is attached to the arm mounting region 20 of hinge member 16 by welding in one embodiment of the invention, although adhesives or other conventional or otherwise known attachment structures and processes can also be used.

Arm 12 can be of any conventional or otherwise known design. For example, although shown as a single member in FIG. 1, the arm can be one of several arms on a conventional E-block or C-block (not shown). In yet other embodiments (not shown) the arm can be an extended mounting region or unimount arm. Typically, the arm 12 with which mounts such as 10 in accordance with the invention are used will have a distal mounting region 44 opposed major surfaces (i.e., top and bottom surfaces) and opposed minor surfaces (i.e., side edges). Various structures such as apertures 28 can be formed in the arm 12. Conventional or otherwise known processes such as stamping, machining, casting and etching can be used to form arms such as 12.

Snap-on mount 10 can be described in greater detail with reference to FIG. 3. As shown, the mount 10 includes a base region 30, a pair of side members 32 extending from the base region 30, and a pair of spring arms 34, one of which extends over the base region from each of the side members. The base region 30 is sized and configured to engage one of the top and bottom surfaces of the arm 12 (FIG. 1). The side members 32 are sized to extend around, and preferably engage, the side edges of the arm. Spring arms 34 are sized and configured to extend over and engage the other of the top and bottom surface of the arm 12.

At least portions of the mount 10 are manufactured from resilient or spring material. The spring arms 34, in combination with the side members 32 and base portion 30 of the mount 10 form generally C-shaped arms. When the mount 10 is attached to arm 12 as shown in FIG. 1, this construction generates a force between the spring arms 34 and base region 30 that biases or urges the spring arms toward the base region. The arm 12 is thereby effectively clamped in the gap between the spring arms 34 and the base region 30. In preferred embodiments the side members 32 are sized to engage and effectively clamp the side edges of the arm 12. In the embodiment shown, spring arms 34 are curved members having a base portion 36 extending from the side members 32, an intermediate portion 38 extending toward the base region 30 of the mount 10, and an engagement portion 40 that extends from the intermediate portion and is generally parallel to the base region. The curved shape of the spring arms 34 enhances the resilient spring force provided by the clip. As shown in FIG. 1, the side members 32 of the mount 10 can be sized to position the base portion 36 of the spring clip 34 at a location spaced from the surface of the arm 10, with portions 38 and 40 configured to cause the engagement portion to engage the arm.

Figure 2:
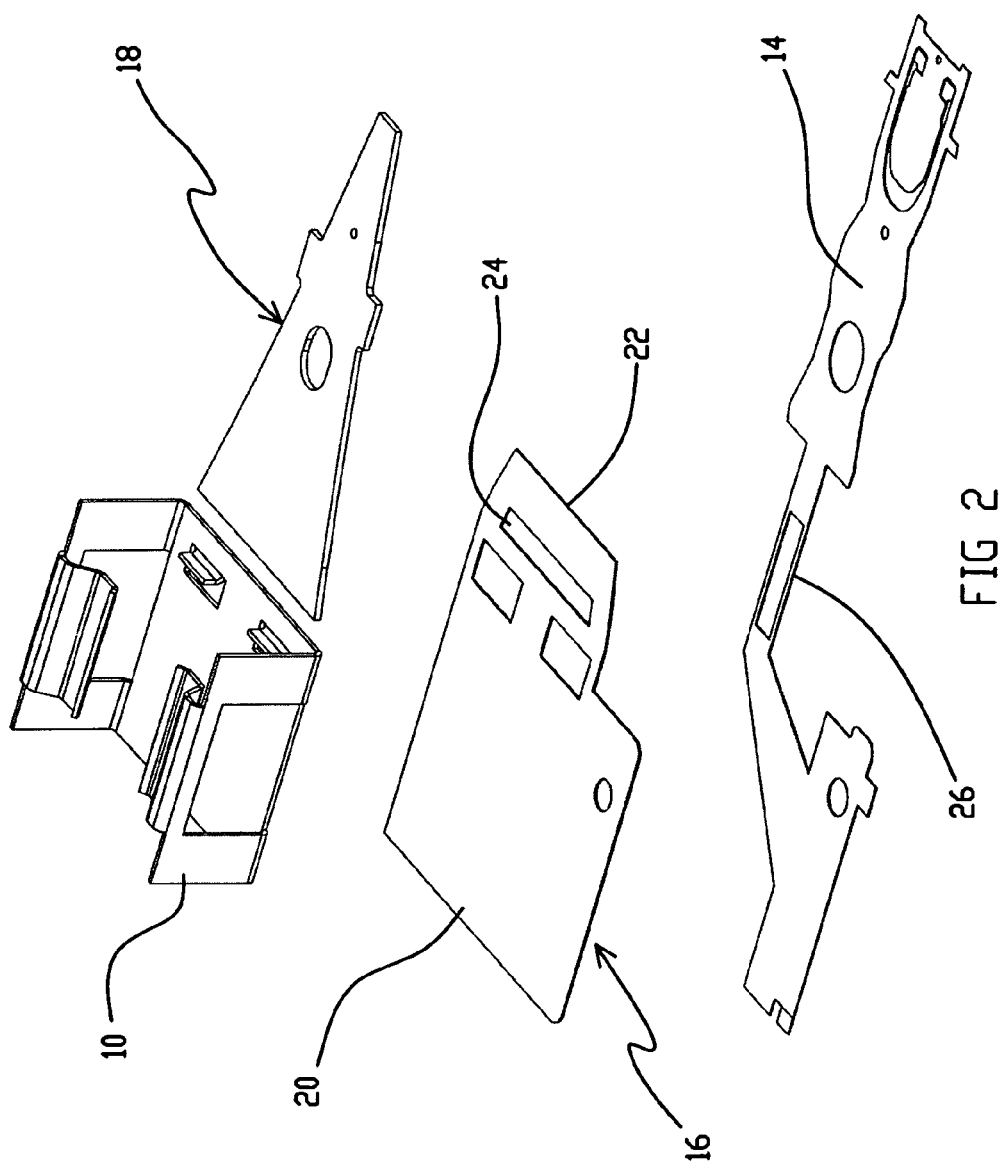
FIG. 2 is an exploded view of the head suspension shown in FIG. 1, illustrating the snap-on mount and other components of the suspension.
Figure 3:
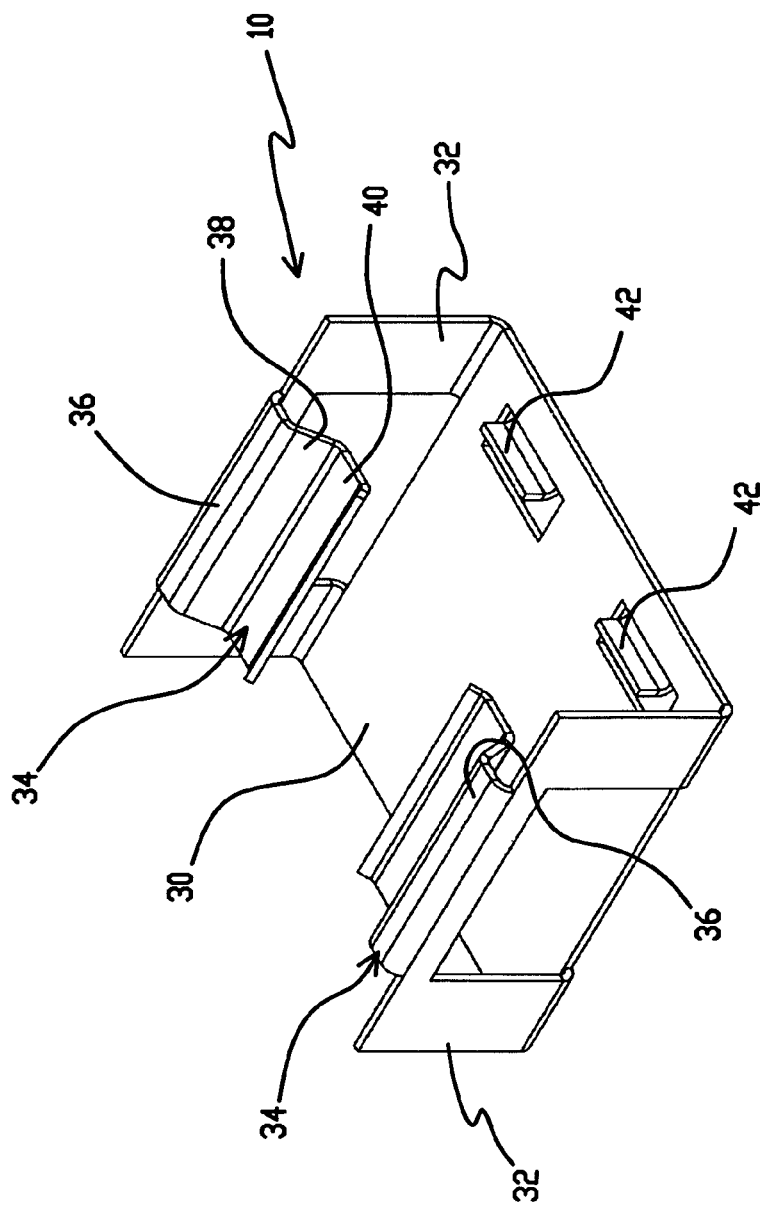
FIG. 3 is a detailed view of the snap-on mount shown in FIG. 1.

The embodiment of snap-on mount 10 shown in FIGS. 1-3 also has a pair of hard stops 42. The hard stops 42 extend out of the surface of base region 30 in the direction of spring arms 34, and have major surfaces that face and engage a distal edge of the arm 12 when the arm is positioned in the mount. The hard stops 42 provide a reference for accurately locating the position of the mount 10 with respect to the arm 12.

Figure 4:
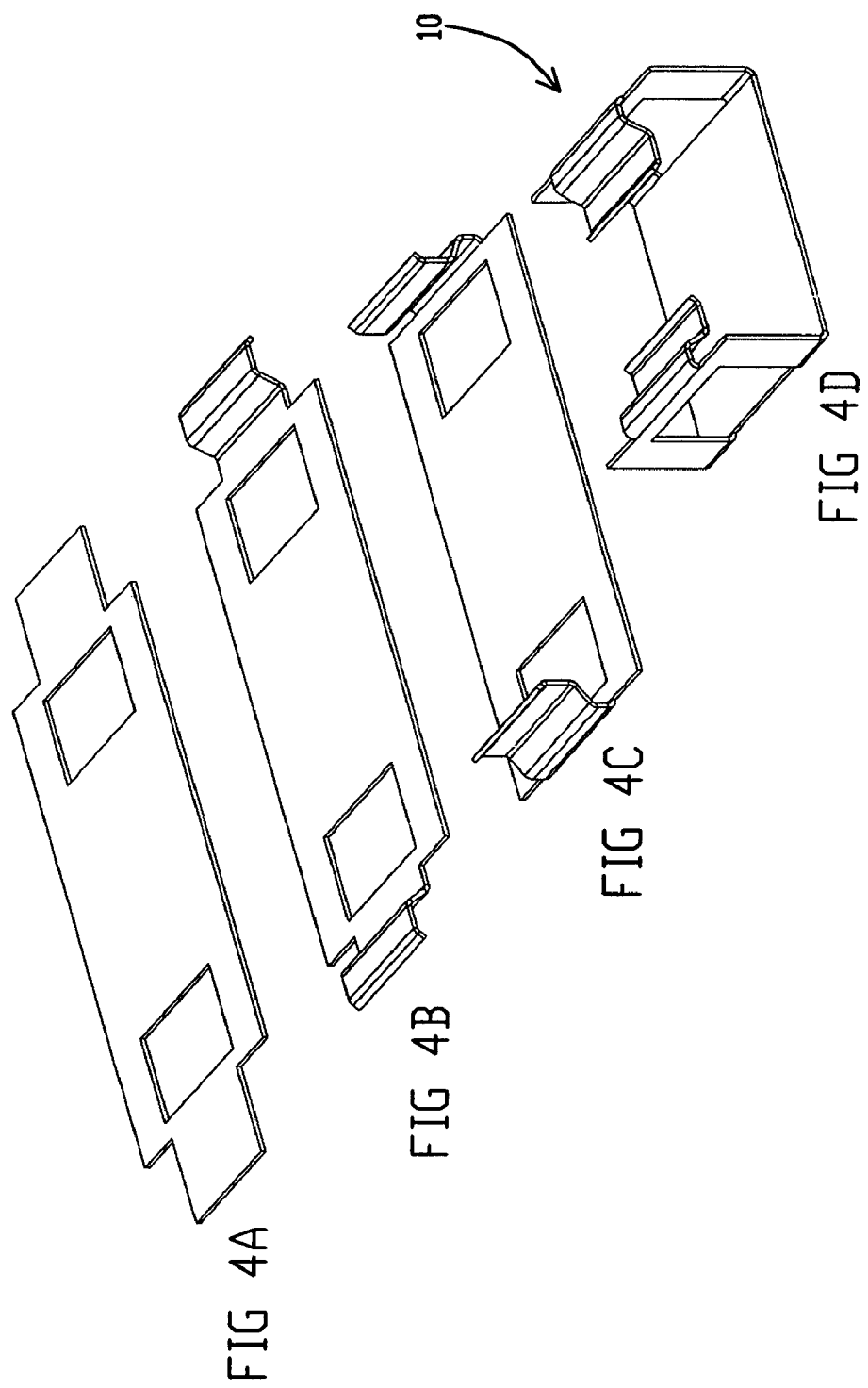
FIGS. 4A-4D are an illustration of a material blank from which the snap-on mount shown in FIG. 1 can be formed and the blank after each of a series of sequential forming operations.

Snap-on mount 10 is preferably fabricated as a one-piece member from stainless steel. FIG. 4A is an illustration of flat blank of sheet material from which the mount 10 can be formed. The blank shown in FIG. 4A can be manufactured by photolithography and etching processes. Alternatively, other conventional or otherwise known methods can be used to manufacture the blank. The blank shown in FIG. 4A can be formed into the snap-on mount 10 using conventional or otherwise known forming processes. FIGS. 4B-4D illustrate a sequence of mechanical bends that can be imparted to the blank shown in FIG. 4A to form the mount 10. Although not shown, the hard stops 42 of the embodiment of mount 10 shown in FIGS. 1-3 can also be formed as part of the process described in connection with FIGS. 4A-4D.

Figure 5:
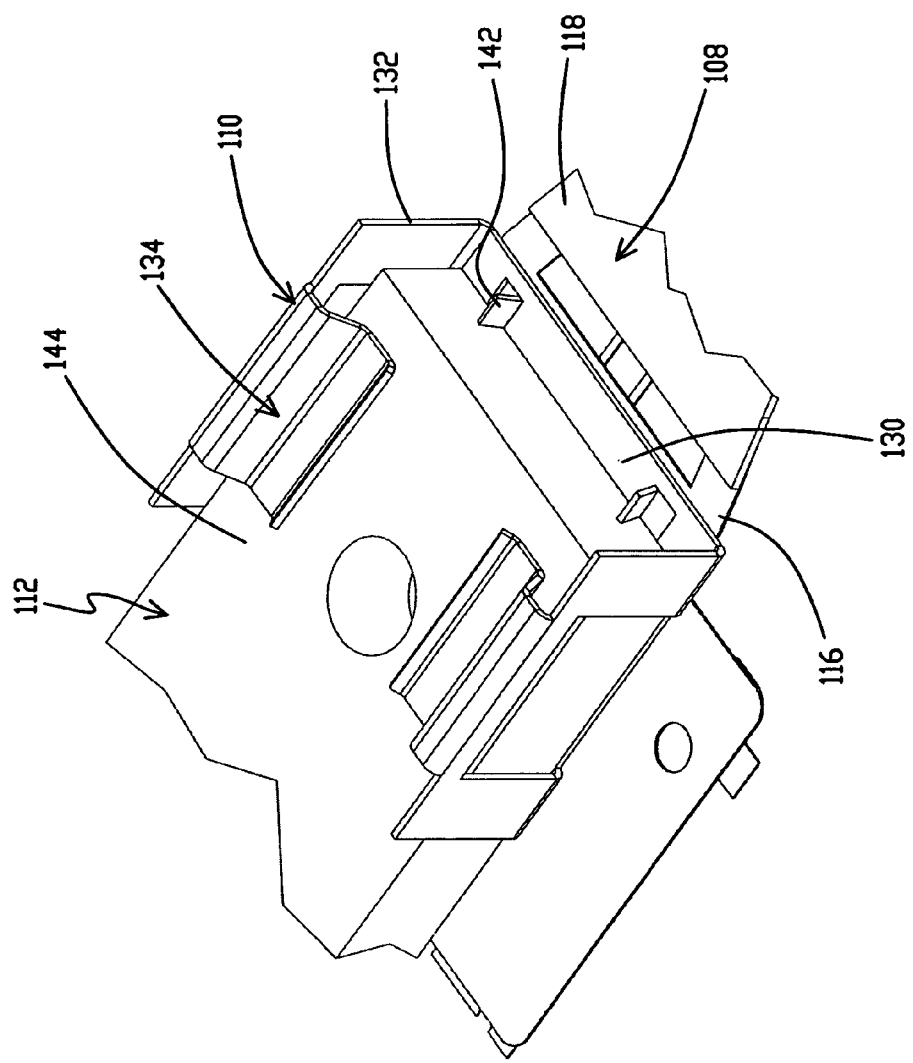
FIG. 5 is an illustration of a disk drive head suspension having a snap-on mount with longitudinally-oriented hard stops in accordance with another embodiment of the present invention mounted to an actuator arm.

FIG. 5 is an illustration of a disk drive head suspension 108 having a spring clip or snap-on mount 110 in accordance with another embodiment of the present invention mounted to an actuator arm 112. Mount 110 has a pair of hard stops 142 that extend out of the base region 130 to position and locate the mount with respect to arm 112. The hard stops 142 have major surfaces that face one another so their edges engage the arm 112. With the exception of this aspect of hard stops 142, mount 110 and arm 112 can be substantially the same as mount 10 and arm 12 described above, and similar features are identified by similar reference numbers in the "1xx" series.

Figure 6:
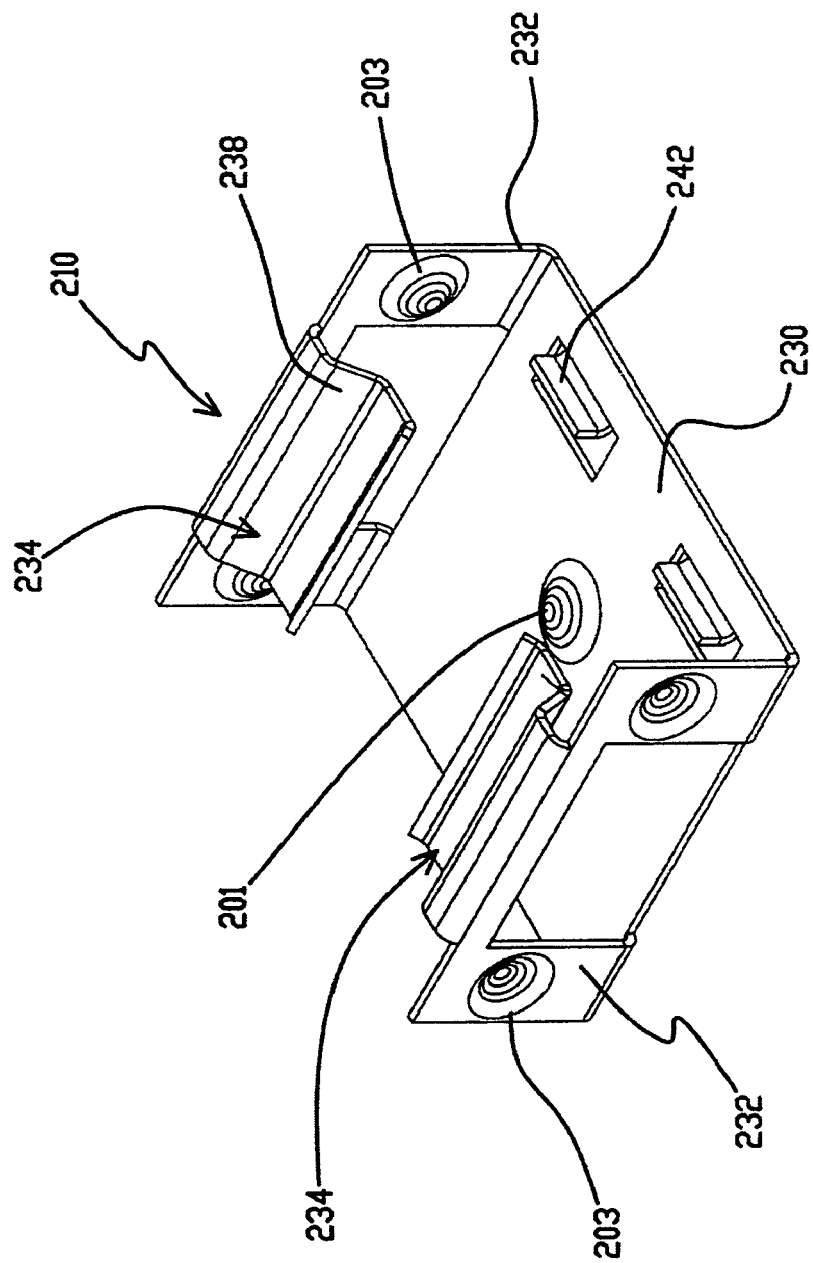
FIG. 6 is a detailed view of a snap-on mount having dimples in accordance with another embodiment of the present invention.

FIG. 6 is an illustration of a snap-on mount 210 in accordance with another embodiment of the invention. As shown, mount 210 includes a protrusion or dimple 201 in the base region 230. The dimple 201 extends toward the spring arms 234, and has a generally smooth surface in the illustrated embodiment. Dimple 201 can be formed by mechanical punching processes, although other conventional or otherwise known manufacturing or forming processes can also be used. The dimple 201 will enhance the force by which mount 210 engages the arm (not shown) to which it is attached. In still other embodiments (not shown), the arm will have a recess at the location corresponding to the dimple 201 when the arm and mount to are properly located and assembled. In this embodiment the dimple 201 will extend into the recess in the arm to enhance the positioning and engagement force of the mount 210 with respect to the arm. Although only one dimple 201 is shown in FIG. 6, the mount 210 can include more than one dimple such as 201 for enhanced location and engagement functionality.

Mount 210 also includes protrusions or dimples 203 in the side members 232. Dimples 203 extend toward one another over the base region 230, and have a generally smooth surface in the illustrated embodiment. Dimples 203 can be formed in the same manner as dimples 201 described above. Dimples 203 are positioned to engage the side edges of the arm (not shown) to which the mount 210 is attached, and enhance the engagement functionality of the mount. With the exception of the dimples 201 and 203, mount 210 can be substantially the same as mount 10 described above, and similar features are identified by similar reference numbers in the "2xx" series.

Figure 7:
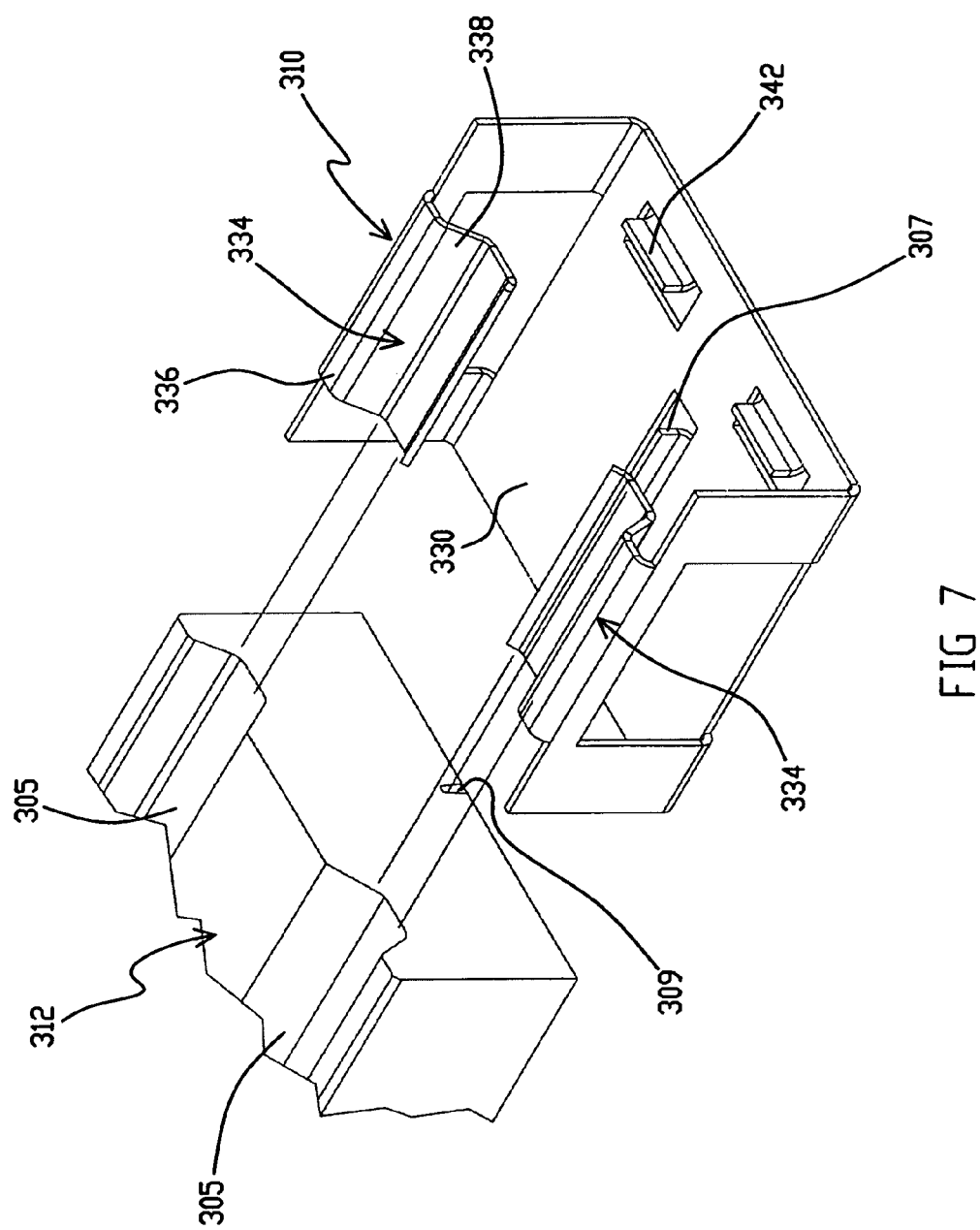
FIG. 7 is a detailed view of a snap-on mount having a longitudinally-extending rail in accordance with another embodiment of the present invention and a portion of an actuator arm to which the mount can be attached.

FIG. 7 is an illustration of a snap-on mount 310 and arm 312 in accordance with another embodiment of the invention. As shown, the arm 312 has longitudinally-oriented and extending slots or grooves 305 in the major (e.g., top) surface. The grooves 305 have a shape corresponding to the shape of the spring arms 334. The spring arms 334 are located on the mount 310 so they will engage the surface of arm 312 in the grooves 305 when the mount is slid over the arm. The relatively large area of contact between the spring arms 334 and arm 312, and in particular the contact between the base portions 336 and intermediate portions 338 of the spring clip and corresponding portions of the arm enhances the engagement functionality of the mount.

Mount 310 also includes a longitudinally-extending rail 307 that protrudes from the surface of the base region 330 facing the spring arms 334. Rail 307 can be formed in a manner similar to that of hard stops 342. The arm 312 configured for use with the rail 307 includes a slot 309 in its major surface. The rail 307 will slide into the slot 309 and engage the arm 312 when the mount 310 is attached to the arm, thereby enhancing the engagement functionality of the mount. Although only one rail 307 is shown in the illustrated embodiment, other embodiments of the mount 310 include more than one rail. With the exception of the features of spring arms 334, rail 307, grooves 305 and slot 309, the mount 310 and arm 312 can be substantially the same as mount 10 described above and similar features are identified by similar reference numbers in the "3xx" series.

Figure 8:
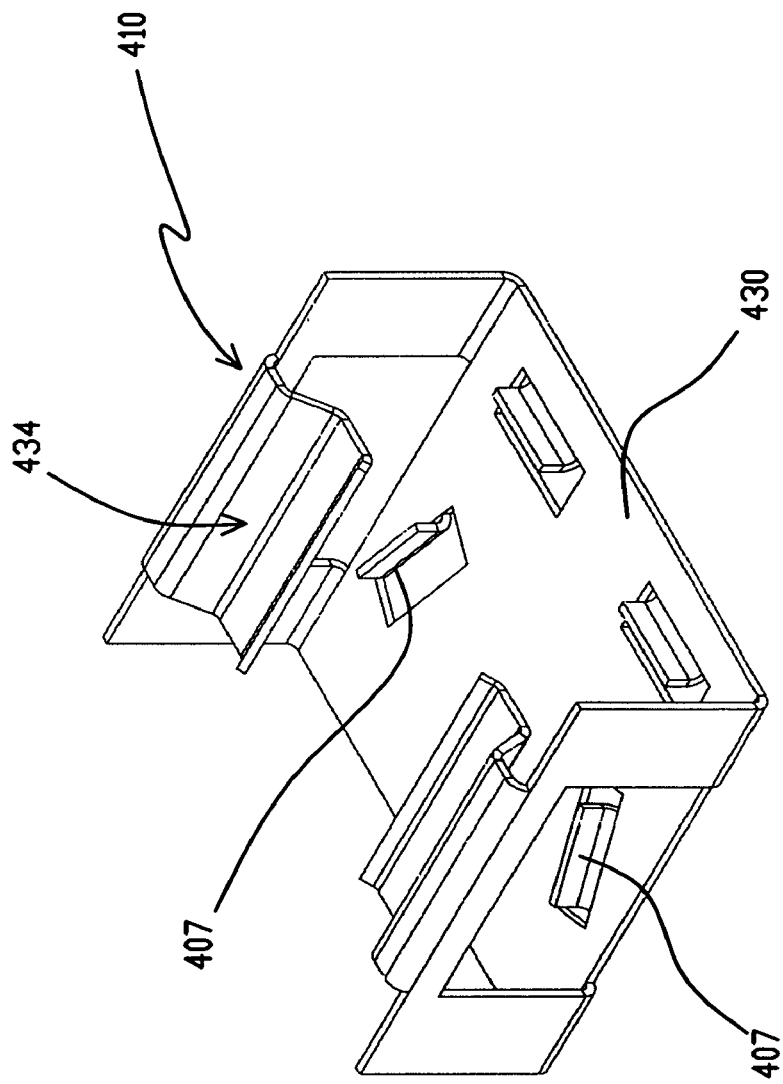
FIG. 8 is a detailed view of a snap-on mount having angled rails in accordance with another embodiment of the present invention.

FIG. 8 is an illustration of a snap-on mount 410 in accordance with another embodiment of the invention. As shown, the mount 410 includes several (two are shown) rails 407 that protrude from the surface of the base region 430 facing spring arms 434. The rails 407 extend at an angle with respect to a longitudinal axis of the mount 410, and are located to engage associated slots or other mating structures in the surface of the arm (not shown) to which the mount is configured to be attached. The configuration of angled rails 407 and the angled slots in the arm enhance the engagement functionality of the mount 410 when the arm wedges between the rails. Although two rails 407 are shown in the illustrated embodiment, other embodiments of the mount 410 include one or more than two rails. With the exception of the rails 407 and associated structures on the arm (not shown), mount 410 can be substantially the same as mount 10 described above, and similar features are identified by similar reference numbers in the "4xx" series.

Figure 9:
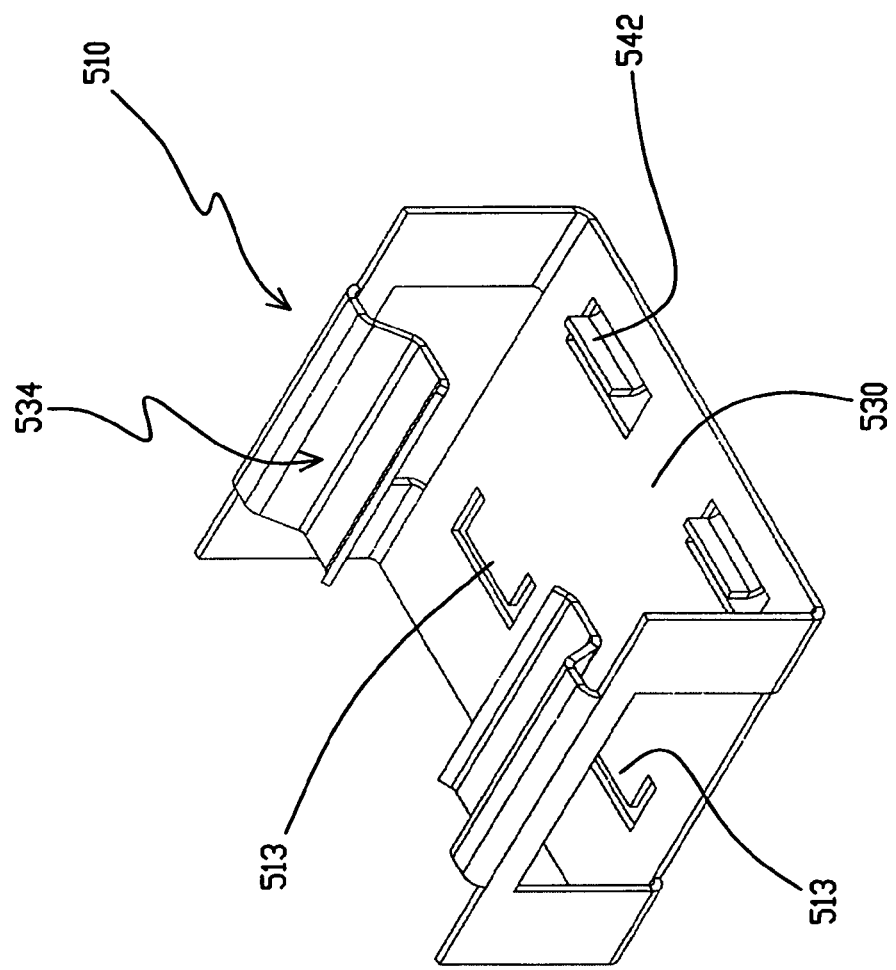
FIG. 9 is detailed view of a snap-on mount having post-assembly-formed hardstop tabs in accordance with another embodiment of the present invention.

FIG. 9 is an illustration of a snap-on mount 510 in accordance with another embodiment of the invention. Mount 510 includes one or more (two are shown) tabs 513 in the base region 530 of the mount. The tabs 513 are shown in an unformed state, flush with the base region 530. After the mount 510 is attached to an actuator arm (not shown), the tabs 513 can be deformed out of the plane of the base region 530 and into engagement with the adjacent major surface of the arm to enhance the functionality of the mount. In some embodiments (not shown) the arm has recesses or other structures that are engaged by the tabs 513 when the tabs are in their deformed state. With the exception of the tabs 513 and any associated structures on the arm, mount 510 can be substantially the same as mount 10 described above, and similar features are identified by similar reference numbers in the "5xx" series.

Figure 10:
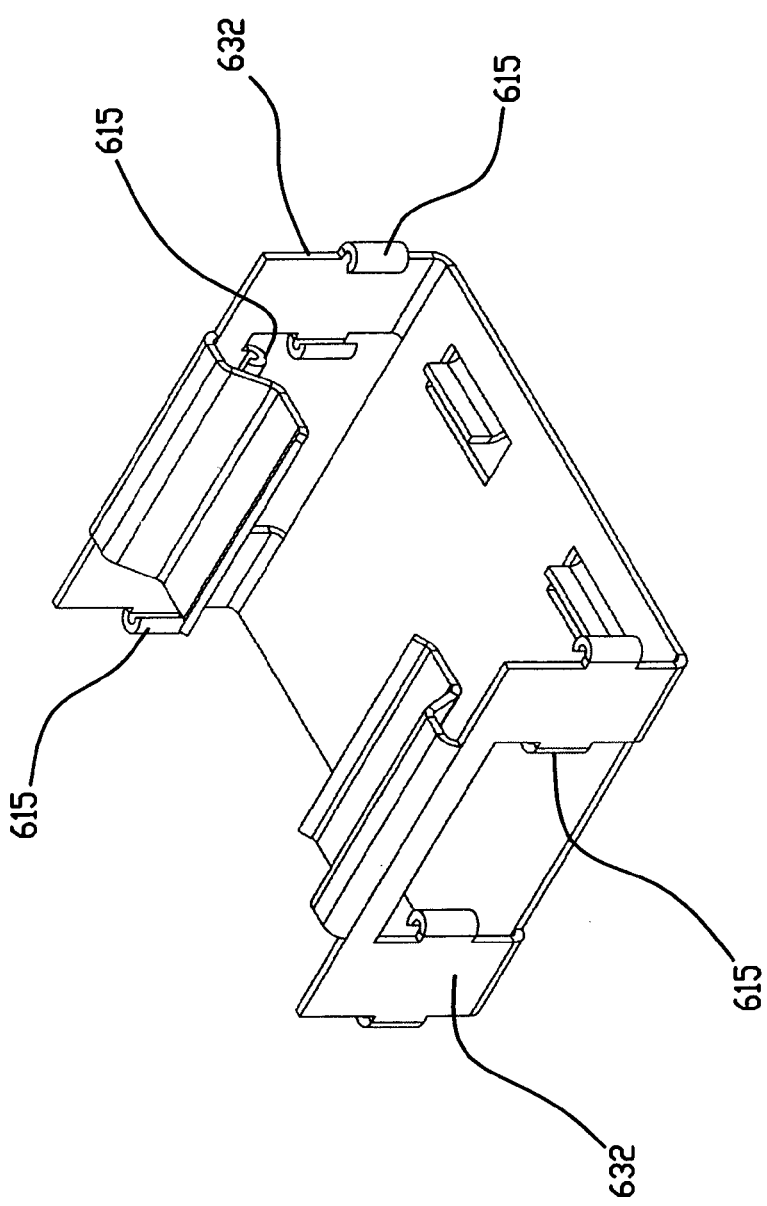
FIG. 10 is a detailed view of a snap-on mount having deformable side member rails in accordance with another embodiment of the present invention.

FIG. 10 is an illustration of a snap-on mount 610 in accordance with another embodiment of the invention. Mount 610 includes one or more (at least eight are shown) deformable features such as rails 615. Rails 615 extend from edges of the side members 632 over the base region 630. The rails 615 can be formed by conventional or otherwise known manufacturing or forming processes, as for example during the forming of the mount 610 from a sheet material blank. Although shown as elongated, semicircular members in FIG. 10, the rails 615 can take other shapes. When the mount 610 is engaged with an arm (not shown) the rails 615 will engage one or more of the major or minor surfaces of the arm. The rails 615 of the embodiment shown in FIG. 10, for example, will engage the top and side surfaces of the arm. The rails 615 will deform or resiliently flex when engaged with the arm, thereby enhancing the functionality of the mount 610. With the exception of the rails 615, mount 610 can be substantially the same as mount 10 described above, and similar features are identified by similar reference numbers in the "6xx" series.

Figure 11:
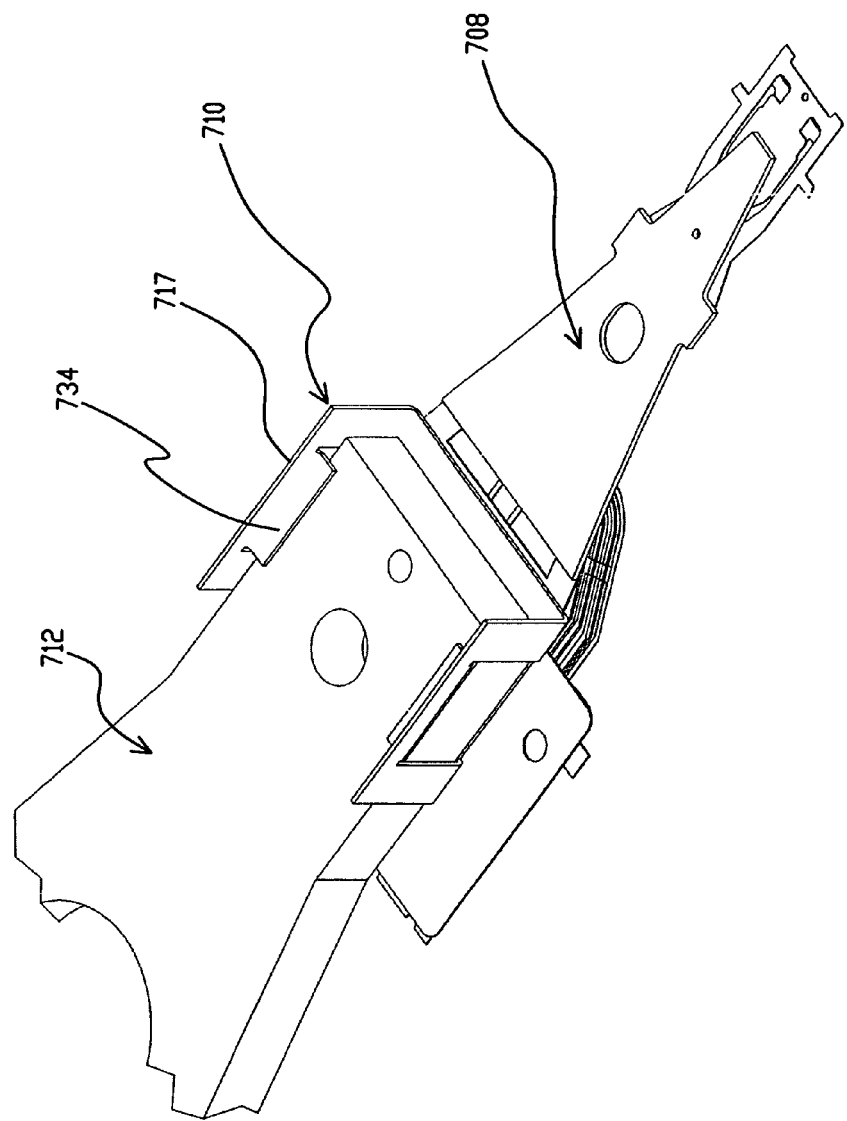
FIG. 11 is an illustration of a disk drive head suspension having a snap-on mount having a generally flat spring arm in accordance with another embodiment of the present invention mounted to an actuator arm.
Figure 12:
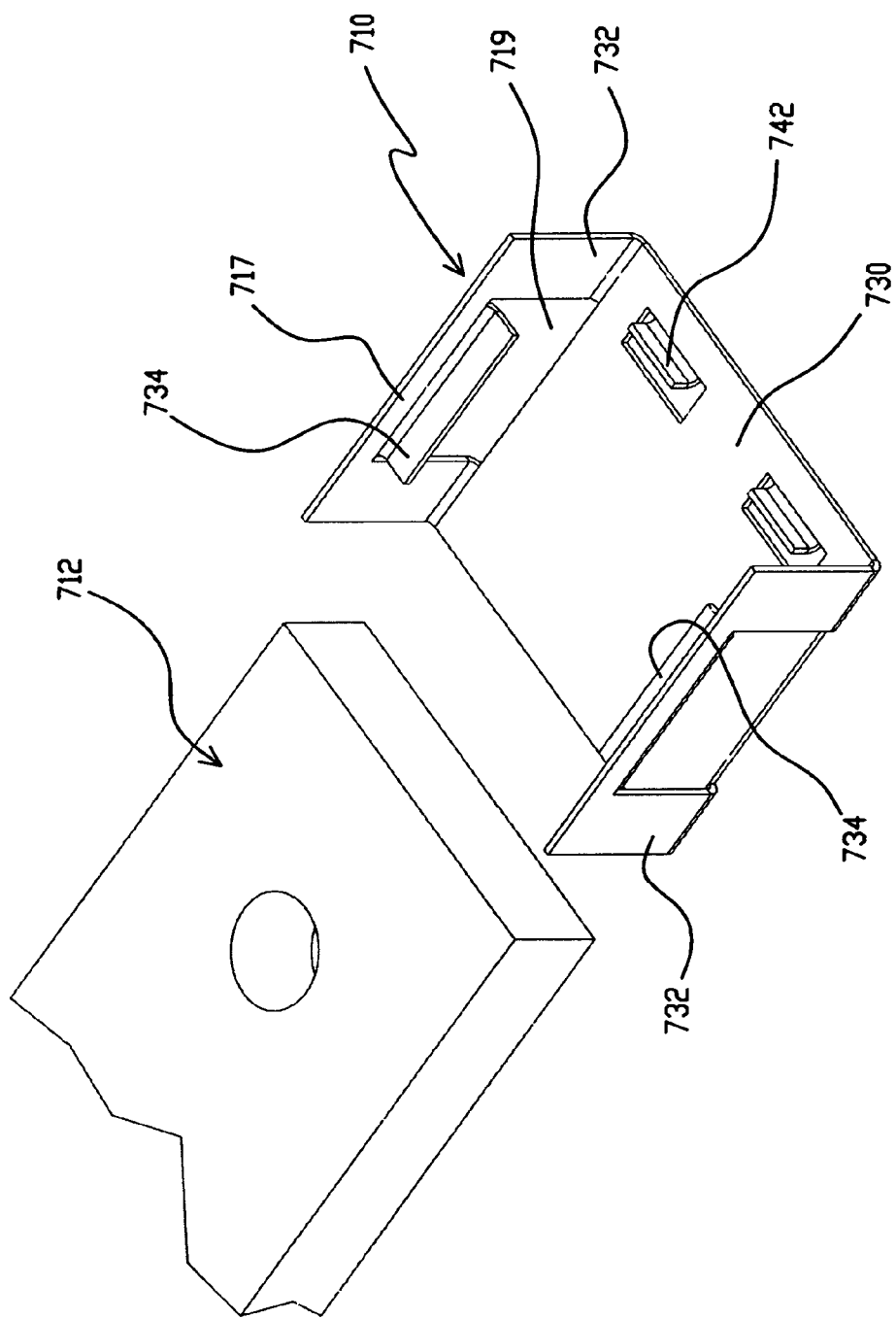
FIG. 12 is an illustration is a detailed view of the snap-on mount shown in FIG. 11 and a portion of the actuator arm.

FIG. 11 is an illustration of a disk drive head suspension 708 having a spring clip or snap-on mount 710 in accordance with one embodiment of the present invention mounted to an actuator arm 712. FIG. 12 is a detailed illustration of the mount 710 and arm 712. As shown in FIGS. 11 and 12, the mount 710 includes side member 732 having spring clips 734 that extend from the side members over the base region 730. Spring clips 734 extend from a lower edge of a cross member portion 717 of the side members 732, adjacent to cutout 719. As shown, the spring clips 734 are generally flat members.

With the exception of the spring clips 734, mount 710 can be substantially the same as mount 10 described above, and similar features are identified by similar reference numbers in the "7xx" series. Suspension 708 and arm 712 can also be substantially the same as the corresponding elements described in connection with mount 10.

Figure 13:
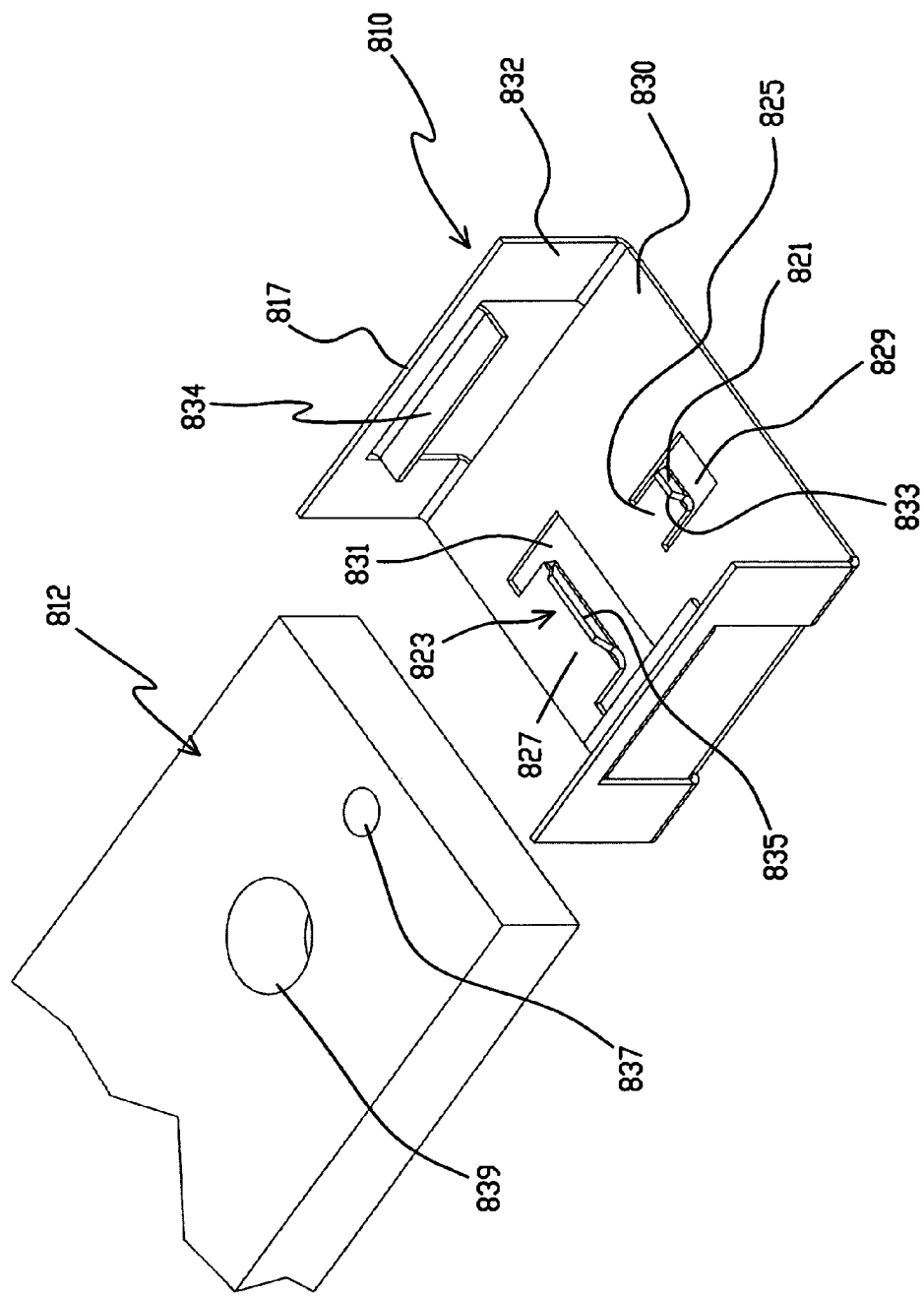
FIG. 13 is a detailed view of a snap-on mount having spring tabs in accordance with another embodiment of the invention, and a portion of an actuator arm to which the mount can be attached.

FIG. 13 is an illustration of a snap-on mount 810 in accordance with another embodiment of the invention. Mount 810 includes two spring tabs 821 and 823 in the base region 830. The spring tabs 821 and 823 have arms 825 and 827, respectively, that are generally co-planar with the surrounding portions of the base region 830, and extend into a partially surrounding cutout region 829 and 831. Lips 833 and 835 extend from the free ends of arms 825 and 827, respectively, out of the plane of the base region 830. Arm 812 includes apertures 837 and 839 that function as engagement structures. When the mount 810 is slid onto arm 812, the lips 833 and 835 will engage the major (e.g., bottom) surface of the arm, forcing the spring tabs 821 and 823 out of the plane of base region 830, away from the arm. The apertures 837 and 839 are positioned in such a manner that when the mount 810 is at a desired location on arm 812, the lips 833 and 835 will mate with the apertures and the resilient force of the arms 825 and 827 will cause the lips to enter and engage the apertures. In effect, the spring tabs 821 and 823 will snap into the apertures when the mount 810 is properly located on the arm 812, thereby enhancing the engagement of the mount to the arm. Although shown as apertures 837 and 839 in the illustrated embodiment, other embodiments (not shown) include other engagement structures such as recesses in the arm 812. Still other embodiments (not shown) have only one or more than two spring tabs such as 821 and 823. With the exception of the spring tabs 821 and 823, snap-on mount 810 can be similar to mount 710 described above, above, and similar features are identified by similar reference numbers in the "8xx" series.

Figure 14:
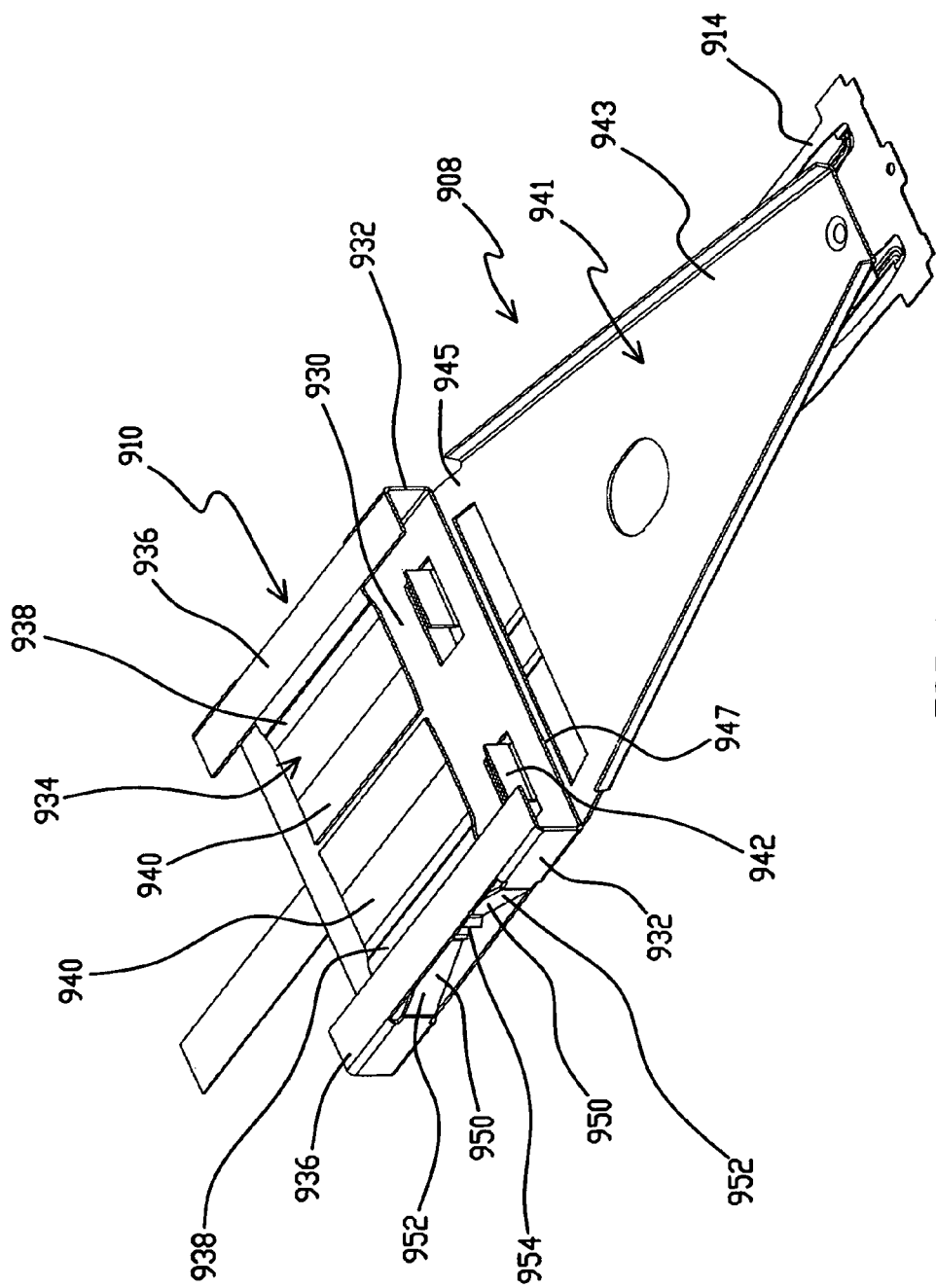
FIG. 14 is an illustration of a disk drive head suspension having a snap-on mount with side spring arms in accordance with another embodiment of the invention.

FIG. 14 is an illustration of a disk drive head suspension 908 having a spring clip or snap-on mount 910 in accordance with another embodiment of the present invention. Suspension 908 is a three-piece member in the illustrated embodiment, and includes an integrated lead or wireless flexure 914, load beam 941 and the mount 910. Load beam 941 can be of any known or conventional design, and includes a rigid region 943, radius or spring region 945 and mounting region 947. Mount 910 can be attached to the mounting region 947 of the load beam 941 by welding or other conventional or known methods. Although not shown, mount 910 can also be incorporated into four-piece suspensions such as suspension 8 described above.

Snap-on mount 910 include base region 930, side members 932 and spring arms 934. The spring arms 934 extend further toward the opposite spring arm (i.e., the two spring arms extend substantially all the way across the mount) and have base portions 936 that extend the full length of side members 932, but are otherwise structurally and functionally similar to the spring arms 34 of mount 10 described above. Similar features are therefore identified by similar reference numbers in the "9xx" series.

A pair of side springs 950 are formed in each of the side members 932 (only two are visible in FIG. 14). As shown, the side springs 950 include spring arms 952 that extend toward each other from portions of the opposite ends of side members 932 into a cutout between the mount base portion 930 and spring arm base portions 936. Springs arms 952 are generally elongate and flat members in the embodiment shown, and have lips 954 at their ends. Side springs 950 are positioned to engage the minor or side surfaces of an actuator arm (not shown) when the mount is attached to the arm, thereby enhancing the engagement functionality of the mount. The lips 954 can enhance the ability of the mount 910 to be removed from an actuator arm (not shown).

Figure 15:
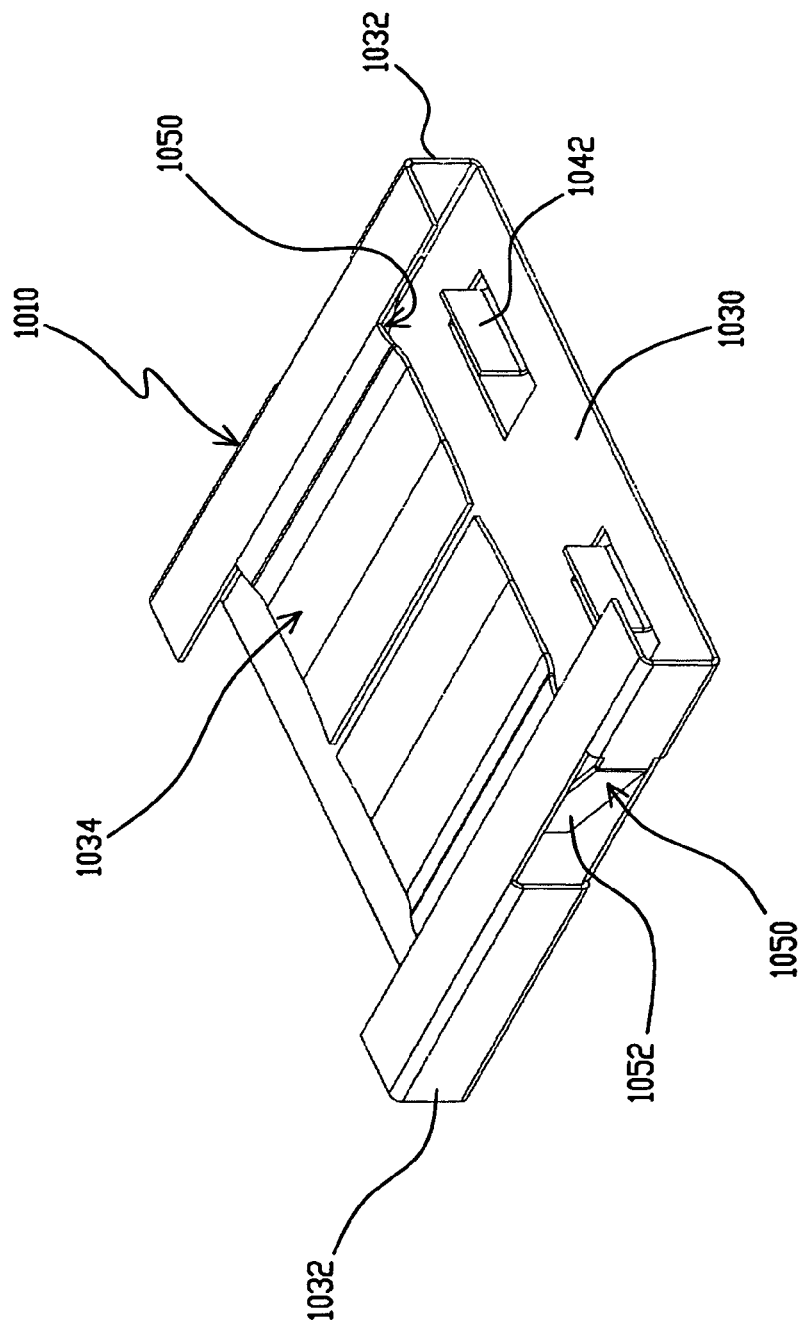
FIG. 15 is a detailed illustration of a snap-on mount having two side spring arms in accordance with another embodiment of the invention.

Although the mount 910 has four side springs 950, other embodiments of the invention have more or fewer side springs. By way of example, FIG. 15 is an illustration of a snap-on mount 1010 having two side springs 1050, one on each side of the mount. With the exception of the different number of side springs 950, mount 1010 can be substantially the same as mount 910 described above, and similar features are identified by similar reference numbers in the "10xx" series.

Figure 16:
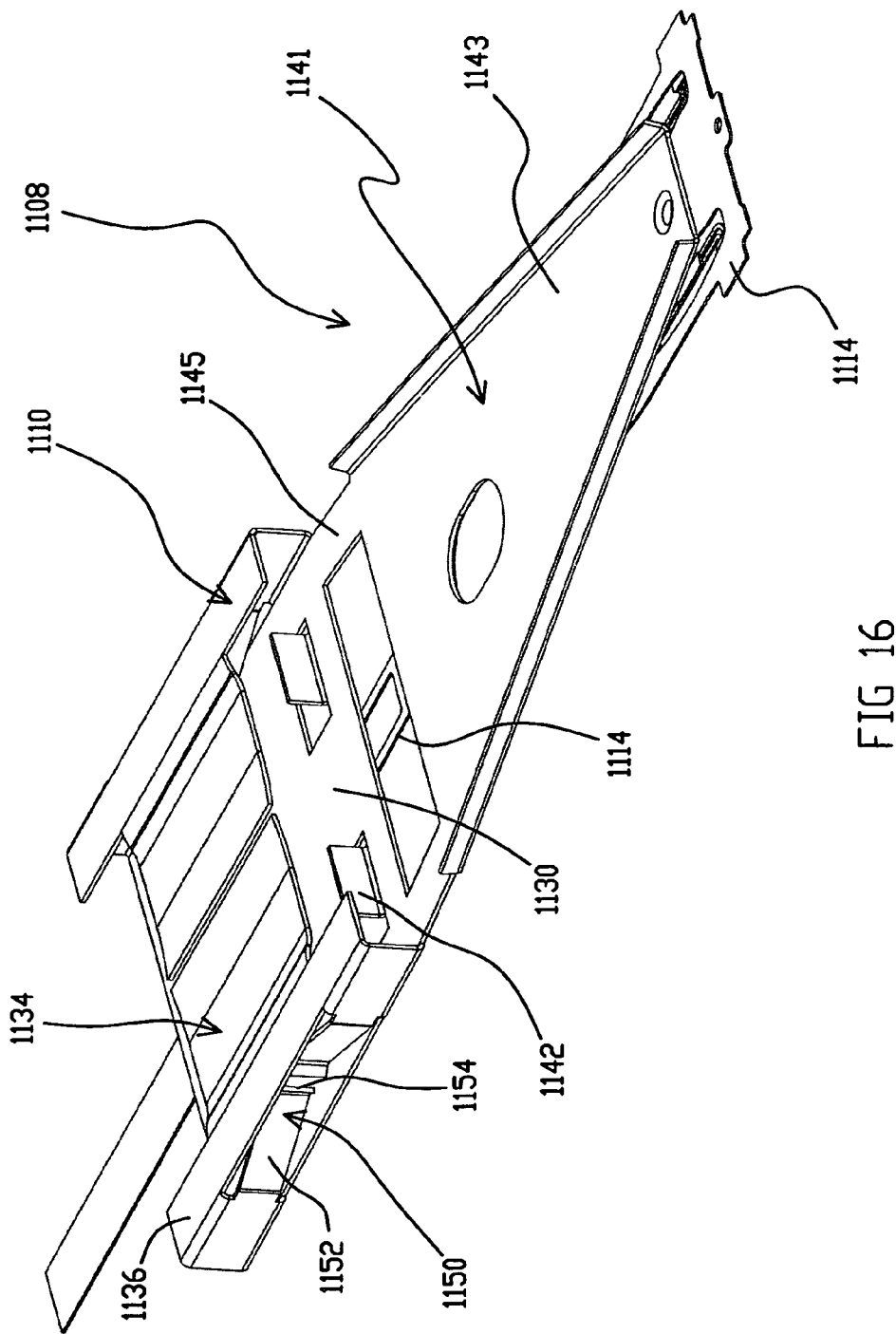
FIG. 16 is an illustration of a two-piece suspension having a snap-on mount with side spring arms in accordance with another embodiment of the invention.

FIG. 16 is an illustration of a two-piece suspension 1108 in accordance with another embodiment of the invention having a load beam 1141 and an integrated lead or wireless flexure 1114. Load beam 1141 is formed from a single sheet of material an includes rigid region 1143, radius or spring region 1145 and mount portion 1110. With the exception of its being formed from the same sheet of material as the other portions of load beam 1141, the mount portion 1110 can be substantially identical to mount 910 described above, and similar features are identified by similar reference numbers in the "11xx" series. Although not shown, yet another embodiment of the invention includes a one-piece suspension having a mount similar to mount portion 1110. A one-piece suspension of this type can be manufactured using conventional or otherwise known photolithographic etching and mechanical forming processes from a laminated sheet of material including spring metal, insulator and conductor layers.

Figure 17:
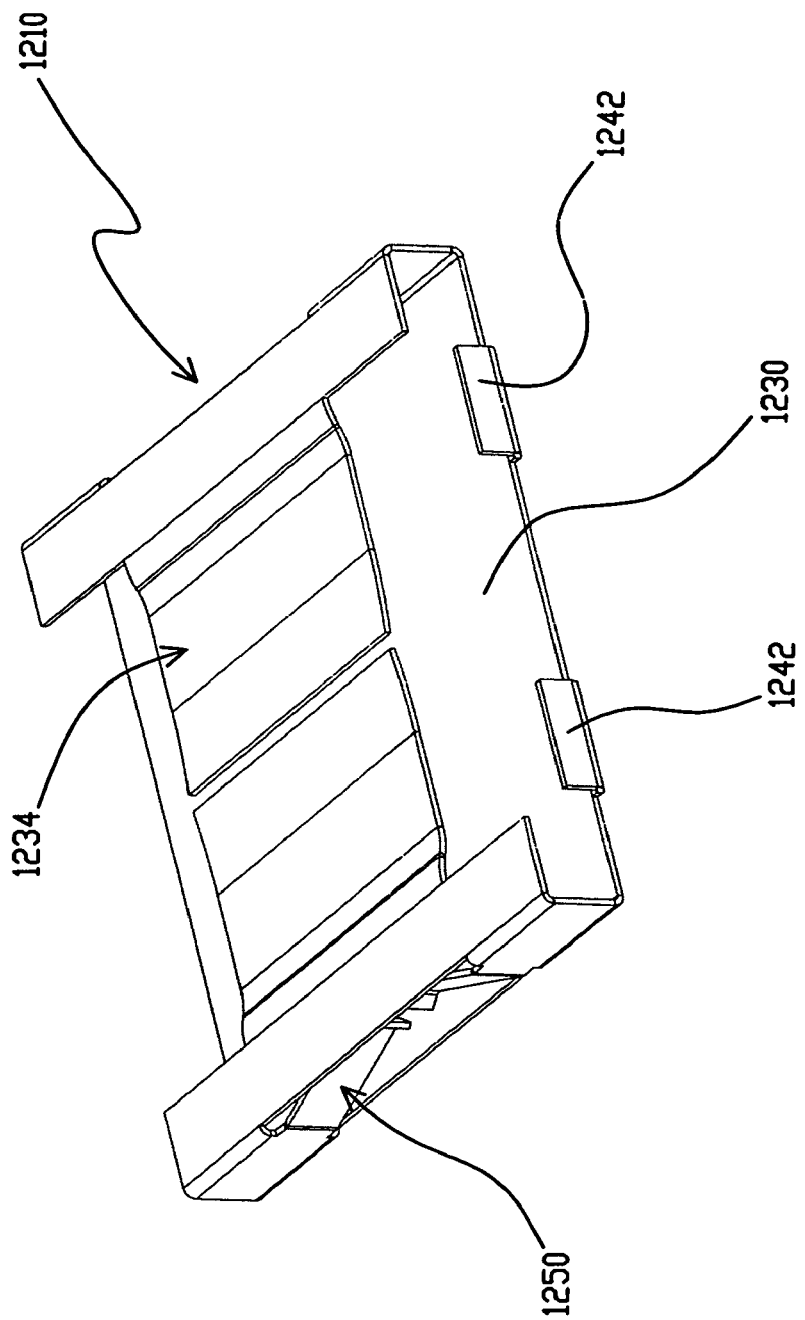
FIG. 17 is a detailed view of a snap-on mount having formed hardstop tabs on its distal edge in accordance with another embodiment of the invention.
Figure 18:
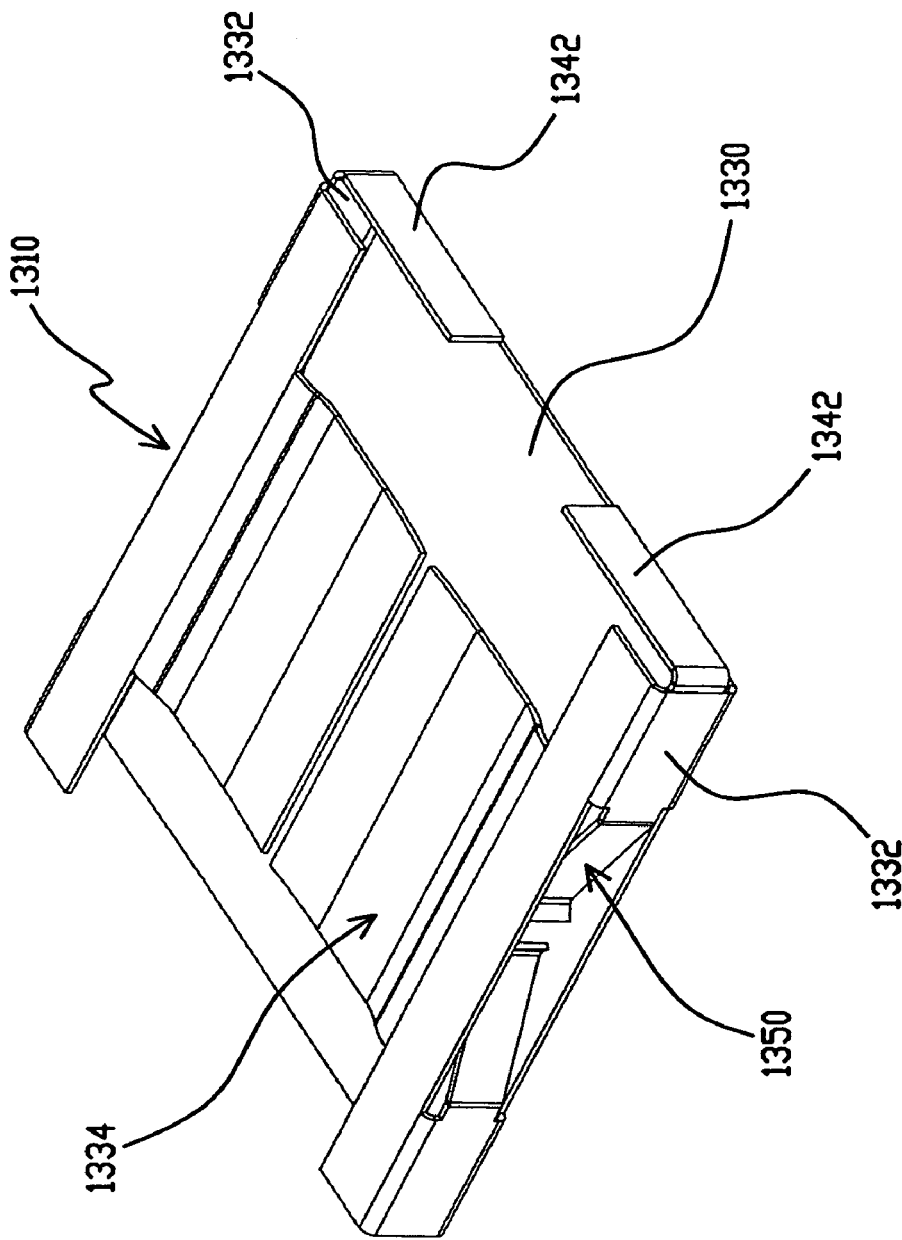
FIG. 18 is a detailed view of a snap-on mount have formed hardstop tabs extending from side members in accordance with another embodiment of the invention.

FIGS. 17 and 18 are illustrations of snap-on mounts 1210 and 1310, respectively, in accordance with additional embodiments of the invention. Mount 1210 includes stops 1242 formed at the distal end of the base portion 1230. Mount 1310 includes stops 1342 on the distal end of the base portion 1330 that are formed from material extending from the side members 1332. The stops 1242 and 1342 accurately position actuator arms (not shown) when they are positioned in the mounts 1210 and 1310, respectively. With the exception of stops 1242 and 1342, mounts 1210 and 1310, respectively, can be substantially the same as mount 910 described above, and similar features are identified by similar reference numbers in the "12xx" and "13xx" series.

Figure 19:
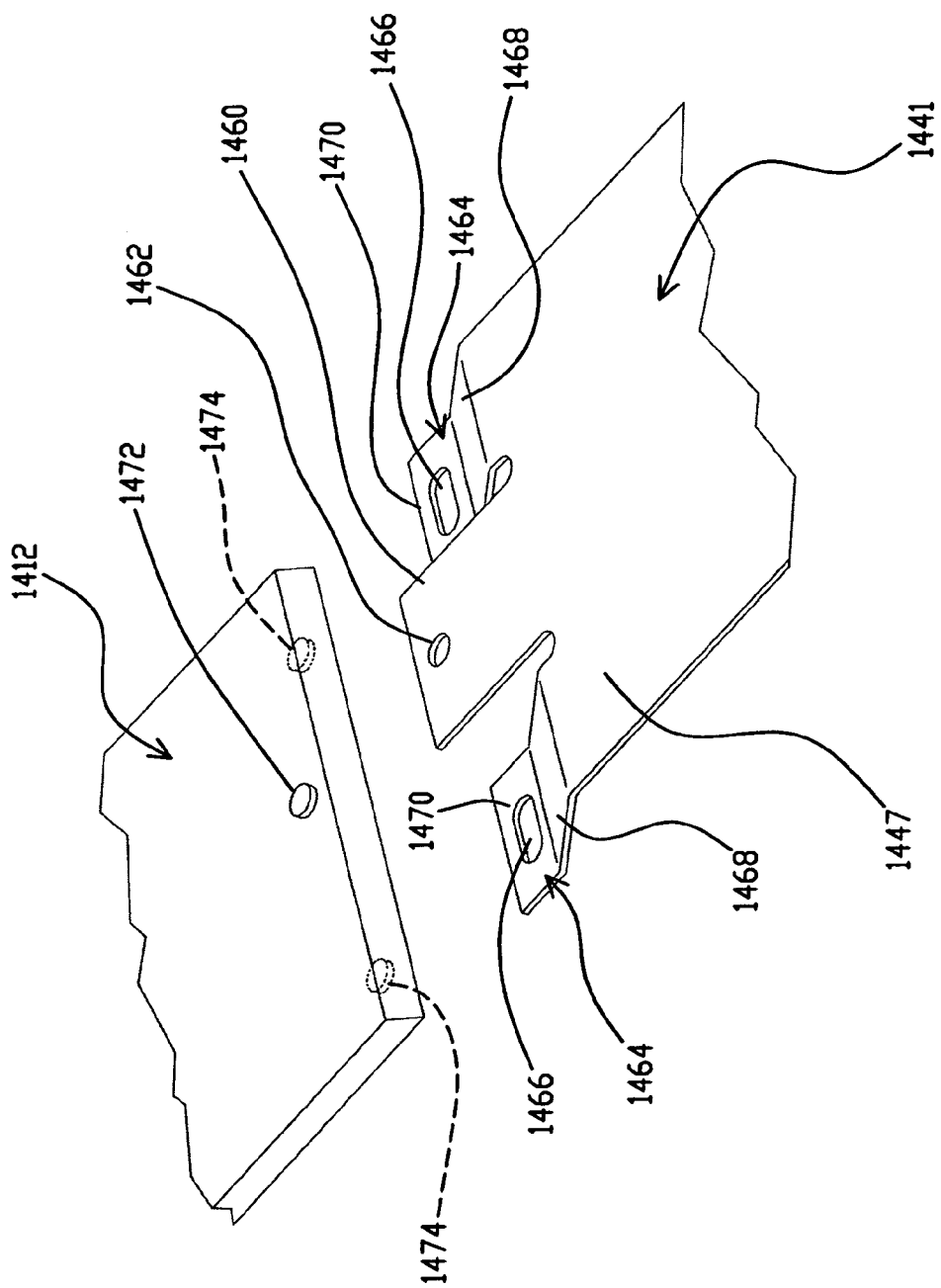
FIG. 19 is an illustration of a portion of a suspension having a snap-on mount with proximally-extending spring tabs in accordance with another embodiment of the invention, and a portion of an actuator arm to which the mount can be attached.

FIG. 19 is an illustration of a proximal portion of a load beam 1441 and a distal portion of an actuator arm 1412 in accordance with another embodiment of the invention. A first tab 1460 having an aperture 1462 extends from the proximal end of the mounting region 1447 of load beam 1441. First tab 1460 is generally co-planar with the proximal portion of the load beam 1441 in the illustrated embodiment. A pair of second tabs 1464 having elongated apertures or slots 1466 extend from the proximal end of the load beam 1441 on opposite sides of the first tab 1460. As shown, second tabs 1464 have an offset portion 1468 that extends out of the plane of the proximal end of load bean 1441, and an end portion 1470 through which the slots 1466 extend. The distal end of arm 1412 includes a boss 1472 extending from a first major (e.g., top) surface of arm 1412, and a pair of bosses 1474 extending from a second major surface.

The tabs 1460 and 1464 on load beam 1441 function as mounts for removably engaging the load beam with the arm 1412. Tabs 1460 and 1464 and corresponding apertures 1462 and 1466 are shaped, sized and positioned to mate with, snap into and engage bosses 1472 and 1474, respectively. The second tabs 1464 provide a preload force when inserted onto the arm 1412. Although not shown in FIG. 19, the proximal edges of tabs 1460 and 1464 can be bent to provide a lead-in for ease of assembling the load beam 1441 to the arm 1412.

Although the illustrated embodiment of load beam 1441 has one first tab 1460 and two second tabs 1464, alternative embodiments (not shown) have a single second tab and a par of first tabs and corresponding bosses on the arm 1412. Yet other embodiments (not shown) have still different numbers and arrangements of first and second tabs. In still other embodiments of the invention (not shown) the first and second tabs are mounted to the proximal end of a hinge or other suspension component such as that shown at 20 in FIG. 2. In another embodiment (not shown) the load beam 1441 is mounted to a base plate or other suspension component rather than arm 1412.

Figure 20:
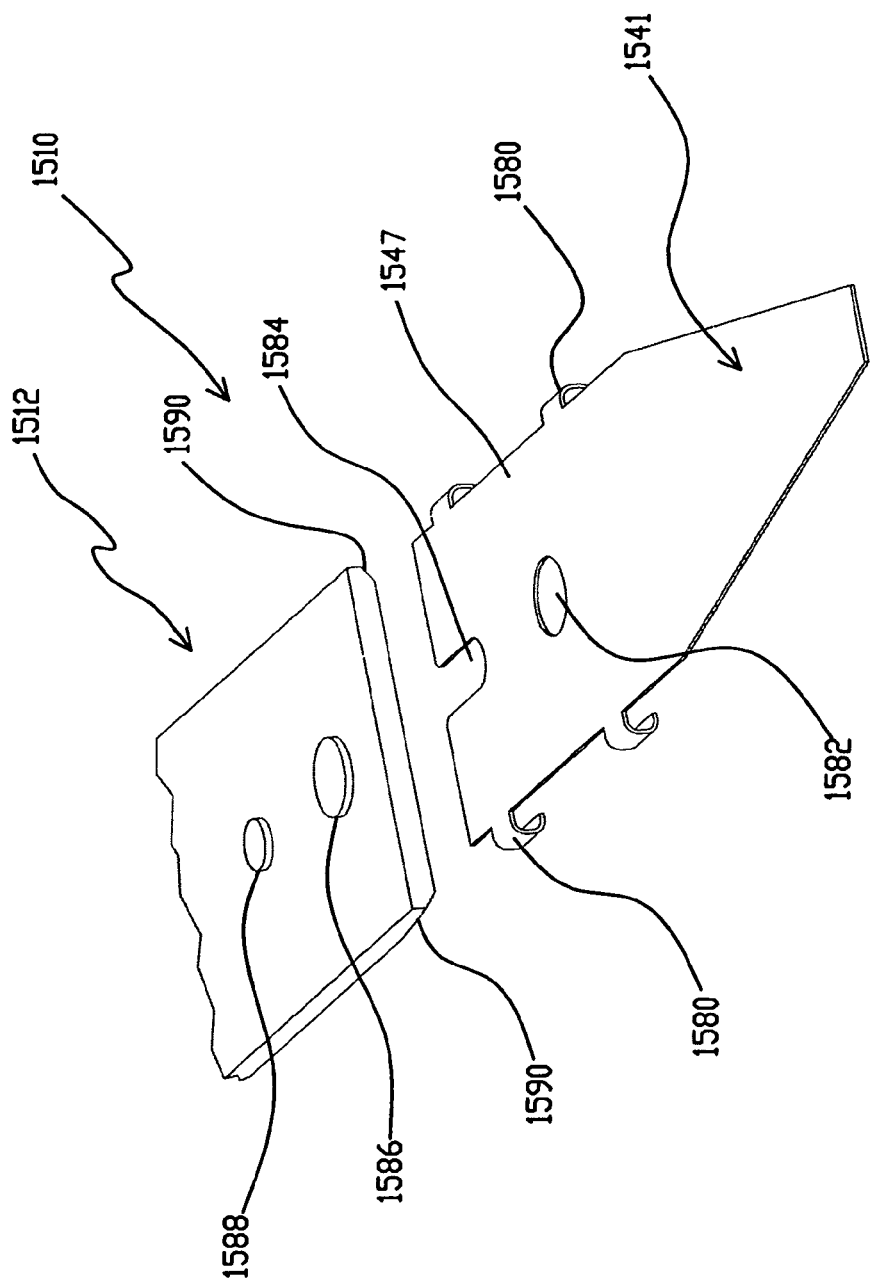
FIG. 20 is an illustration of a load beam having a snap-on mount with curved tabs in accordance with another embodiment of the invention, and a proximal portion of an actuator arm to which the mount can be attached.

FIG. 20 is an illustration of a load beam 1541 having a snap-on mount 1510 and a distal portion of an actuator arm 1512 in accordance with another embodiment of the invention. As shown, a mounting region 1547 of the load beam 1541 includes several (four are shown) shaped tabs 1580. Tabs 1580 are generally C-shaped in the illustrated embodiment, but other shapes can also be used. The mounting region 1547 also includes an aperture 1582 and slot 1584. Slot 1584 extends into the mounting region 1547 from the proximal end of the load beam 1541. The distal end of arm 1512 includes a locating boss 1586 and an orientation boss 1588 on one of the major surfaces (e.g., the top surface). The distal corners of the arm 1512 are shaped to provide tapered lead-in surfaces 1590.

The tabs 1580 on load beam 1541 function as mounts for removably engaging the load beam with the arm 1512. Aperture 1582 and slot 1584 are shaped, sized and positioned to mate with and engage the bosses 1586 and 1588, respectively, to accurately locate the load beam 1541 on the arm 1512. The lead-in surfaces 1590 guide the tabs 1580 onto the arm 1512 when the suspension is being mounted. When the mounting region of the load beam 1541 is located on the first major surface of arm 1512, the tabs 1580 extend around and engage the minor (i.e., side) surfaces of the arm, and engage the second major arm surface, to provide a preload clamping force. Although not shown, the leading edges of the slot 1584 can be formed out of the plane of the mounting region 1547 to enable the slot to ride up and over boss 1586 and snap onto boss 1588 during insertion. Other embodiments (not shown) include different numbers and/or locations of tabs, apertures slots and bosses. In still other embodiments (not shown) the tabs are mounted to the proximal end of a hinge or other suspension component. In yet another embodiment (not shown) the load beam 1541 is mounted to a base plate or other suspension component rather than arm 1512.

FIG. 21 is an illustration of a load beam 1641 having a snap-on mount 1610 mounted to an actuator arm 1612 in accordance with another embodiment of the invention. FIG. 22 is a detailed illustration of a portion of the mounting region 1647 of the load beam 1641. As shown, a spring tab 1621 is located the mounting region 1647. Spring tab 1621 has an arm 1625 that is generally co-planar with the surrounding portions of the mounting region 1647 and extends into the partially surrounding cutout region 1629. Lip 1633 extends from the free end of arm 1625 out of the plane of the base mounting region 1647. Arm 1612 includes an aperture 1637 that functions as an engagement structure. When the load beam 1641 is slid onto arm 1612, the lip 1633 will engage the major (e.g., bottom) surface of the arm, forcing the spring tab 1621 out of the plane of the mounting region 1647, away from the arm. The aperture 1637 is positioned in such a manner that when the load beam 1641 is at a desired location on arm 1612, the lip 1633 will mate with the aperture 1637 and the resilient force of the arm 1625 will cause the lip to enter and engage the aperture. In effect, the spring tab 1621 will snap into the aperture when the load beam 1641 is properly located on the arm 1612, thereby enhancing the engagement of the load beam to the arm. The distal end of the arm 1612 can include a tapered lead-in surface 1692 to guide the spring tab 1621 when the load beam 1641 is mounted to the arm 1612. Although shown as aperture 1637 in the illustrated embodiment, other embodiments (not shown) include other engagement structures such as recesses in the arm 1612. Still other embodiments (not shown) have more than one spring tabs such as 1621. With the exception of the spring tab 1621 and the features shown in the base mounting region 1647, load beam 1641 can be similar to load beam 1541 described above, and similar features are identified by similar reference numbers in the "16xx" series.

FIG. 23 is an illustration of a proximal portion of a load beam 1741 having a snap-on mount 1710 in accordance with another embodiment of the invention, and a distal portion of an actuator arm 1712 to which the mount can be attached. As shown, mount 1710 includes tabs 1759 on the sides of the mounting region 1747. Tabs 1759 extend into gaps 1761 of the load beam and include an arm portion 1763 and an end portion having shoulders 1765 that is wider than the arm portion. Tabs 1759 are preformed with the arm portion 1763 formed out of the plane in the mounting region 1747 in the direction of the surface of the mounting region that is to be attached to the actuator arm 1712, and the shoulders 1765 formed out of the plane of the arm portions in a direction opposite that of the arm portion. Actuator arm 1712 includes structures such as recesses or slots 1767 that have a width that is greater than the width of the arm potion 1763 of the tabs 1759, but less than the width of the unformed end portion having shoulders 1765.

The tabs 1759 on load beam 1741 function as mounts for removably engaging the load beam with the arm 1712. Tabs 1759 and corresponding slots 1767 are shaped, sized, and positioned to enable the tabs to mate with and engage the slots. As shown in FIG. 24, the tabs 1759 can extend out of the plane of the mounting region 1747 with the shoulders 1765 engaged with the edges of actuator arm 1712 in slots 1767. Alternatively, as shown in FIG. 25, the tabs can extend through the slots 1767 with the shoulders 1765 engaging the major surface of the actuator arm opposite the surface to which the load beam 1741 is mounted. In the approaches shown in both FIGS. 23 and 24, the resilient nature of the tabs 1759 causes them to engage and lock the load beam 1741 onto the actuator arm 1712. Although two tabs 1759 and corresponding slots 1767 are shown in FIG. 22, other embodiments (not shown) have one or more than two tabs and slots.

Figure 26:
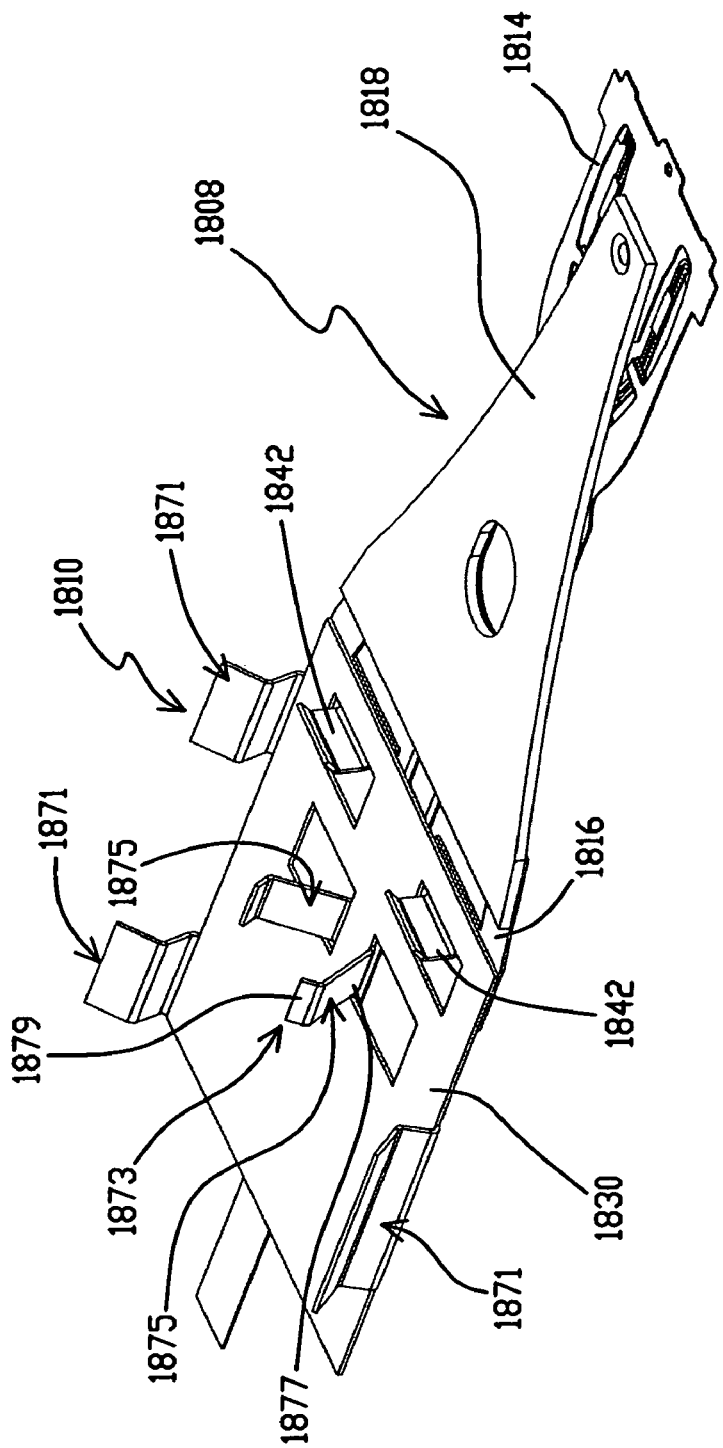
FIG. 26 is an illustration of a four-piece suspension having a snap-on mount with a through-hole spring clip in accordance with another embodiment of the invention.
Figure 27:
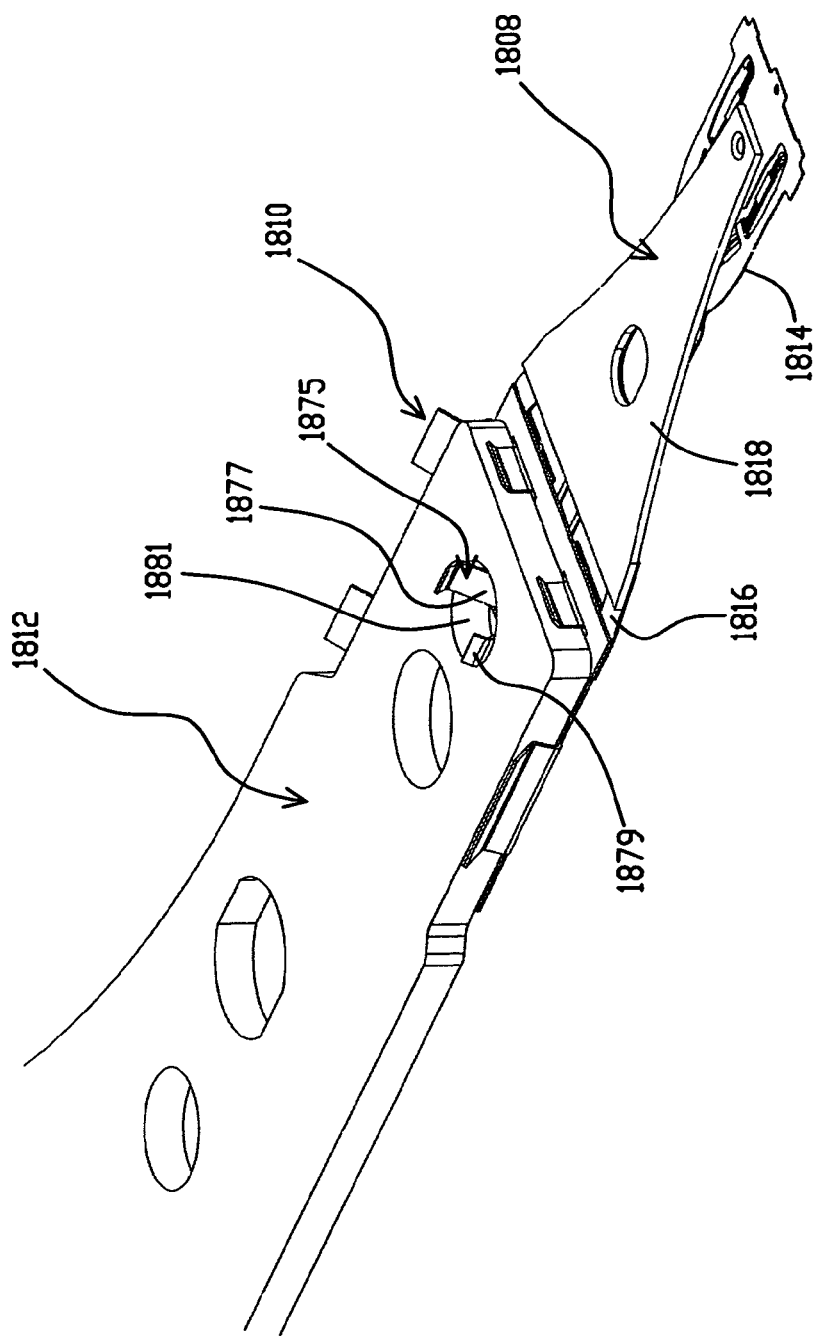
FIG. 27 is an illustration of the suspension shown in FIG. 26 attached to an actuator arm in accordance with another embodiment of the invention.

FIG. 26 is an illustration of a disk drive head suspension 1808 having a snap-on mount 1810 in accordance with another embodiment of the present invention. FIG. 27 is an illustration of the suspension 1808 mounted to an actuator arm 1812. Suspension 1808 is a four-piece member in the illustrated embodiment, and includes an integrated lead or wireless flexure 1814, hinge member 1816 and load beam stiffener 1818 in addition to mount 1810. With the exception of mount 1810, suspension 1808 can be similar to suspension 8 described above, and similar features are identified by similar reference numbers in the "18xx" series.

Mount 1810 includes a base region 1830, side springs 1871, through-hole spring 1873 and stops 1842. Side springs 1871 are generally sideways, outwardly opening V-shaped members that extend from the side edges of the base region 1830. Through-hole spring 1873 includes a pair of clips 1875 having a leg 1877 extending from the base region 1830 and a lip 1879 at the free end of the leg. The clips 1875 are formed out of the plane of base region 1830 with the major surfaces of the legs 1877 generally facing one another, but diverging with increasing distance from the base region. The lips 1879 are formed in the opposite directions of the associated legs 1877, and extend toward one another with increasing distance from the base region 1830. Stops 1842, like side springs 1871 are outwardly opening V-shaped members. They extend out of the plane of the base region 1830 and are generally positioned similarly to the stops 42 described above in connection with mount 10. Stops 1842 assist with the alignment of actuator arm 1812 when it is attached to the mount 1810.

As shown in FIG. 27, arm 1812 includes an aperture 1881 that is sized and located to receive the through-hole spring 1873 when the arm is properly located on the mount 1810 adjacent to stops 1842. The clips 1875 are sized and positioned with respect to the aperture 1881 so that the clips are biased away from one another and into engagement with the arm 1812 when the mount 1810 is on the arm. The lips 1879 function as a lead-in structure, enabling the aperture 1881 to engage and push the clips 1875 toward one another against their bias force while the mount 1810 is being attached to the arm 1812. In the illustrated embodiment, the clips 1875 extend through the aperture 1881 and engage the arm at the edges of the major surface of the arm 1812. The sloping nature of the clips in this embodiment provides engagement forces that resist any tendency of the mount 1810 to pull away from the arm 1812. In other embodiments (not shown) the clips engage the arm 1812 within the aperture 1881. Similarly, side springs 1871 engage the side edges of the arm 1812 in the illustrated embodiment, but can engage the upper surface of the arm at the edges in other embodiments (not shown). Although the illustrated embodiment of the invention has two relatively small side springs 1871 on one side of the mount 1810, and a relatively large side spring on the opposite side, side springs of other numbers, sizes and positional configurations are used in other embodiments (not shown).

Figure 28:
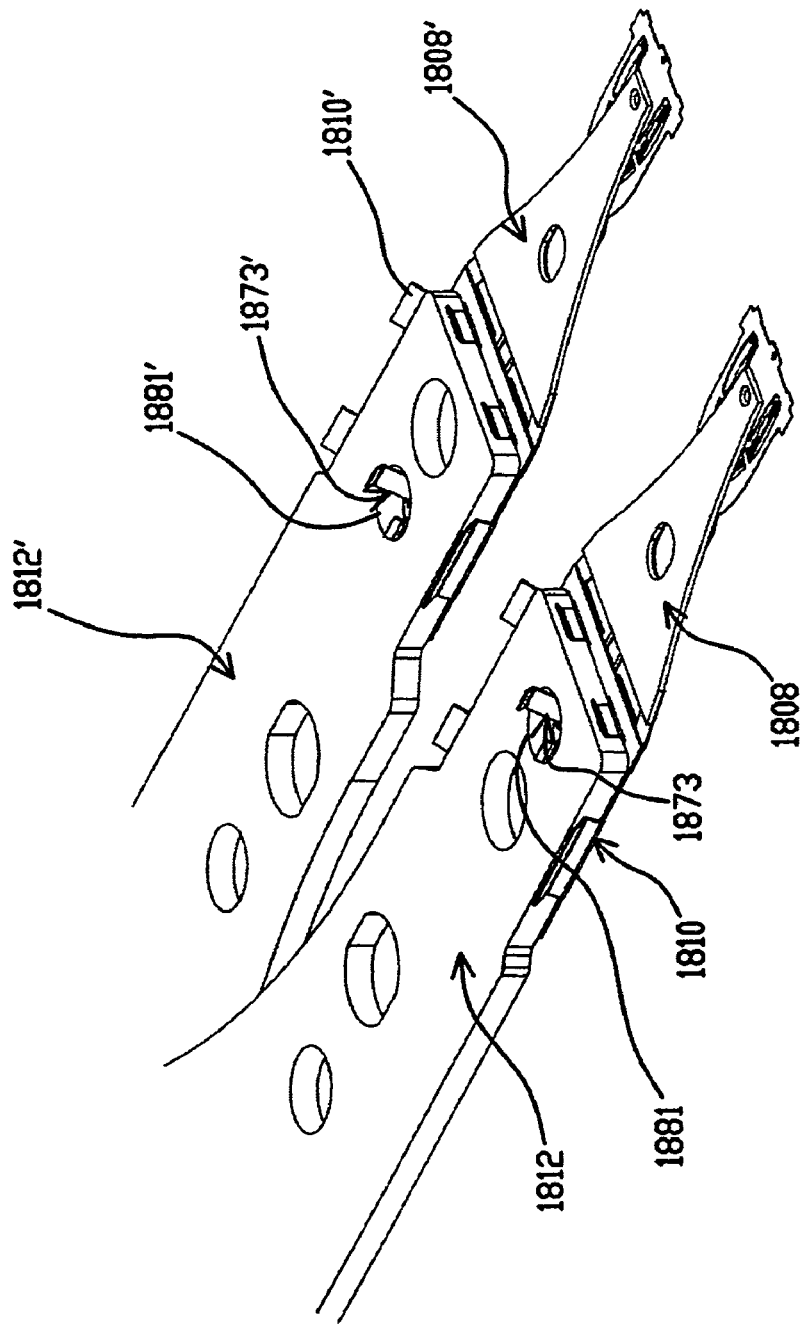
FIG. 28 is an illustration the suspension, mount and arm shown in FIG. 27, and a complementary suspension, mount and arm that can be stacked.
Figure 29:
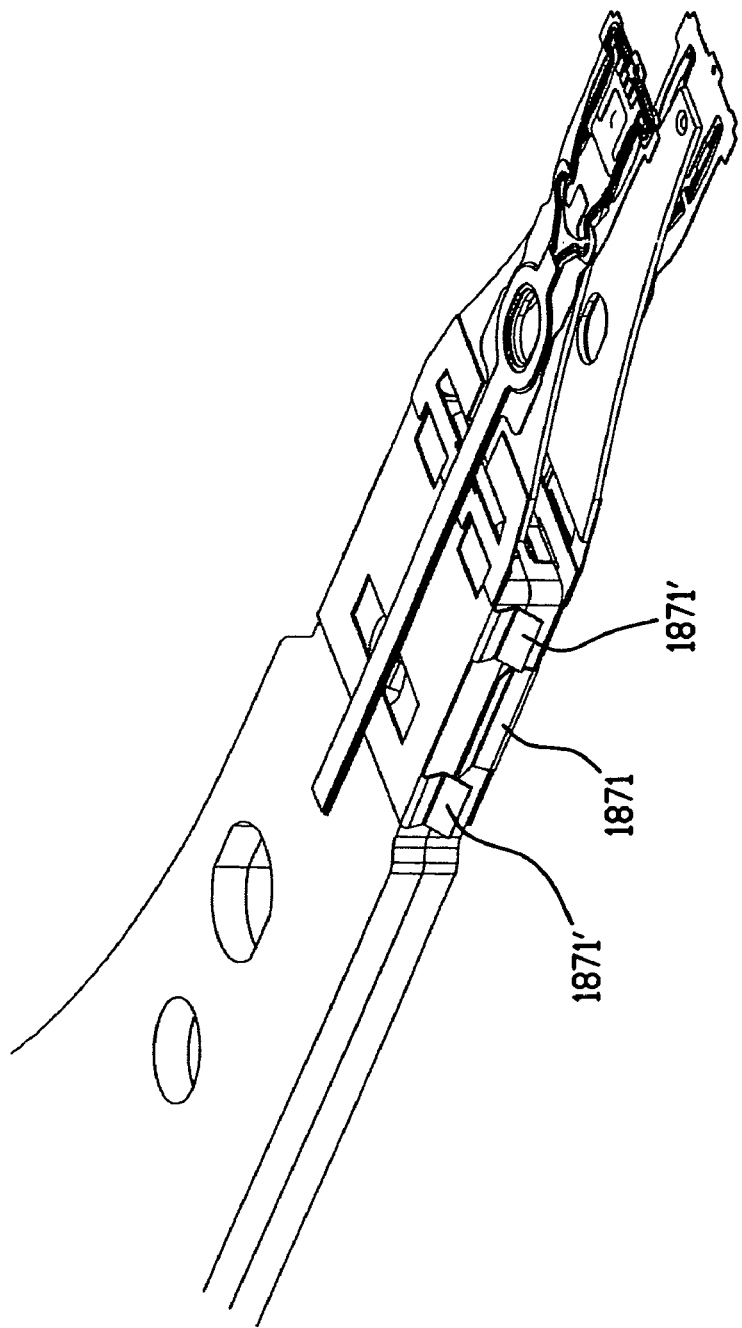
FIG. 29 is an illustration of the suspensions, mounts and arms shown in FIG. 28 stacked back-to-back.

FIG. 28 is an illustration of the suspension 1808, mount 1810 and arm 1812 adjacent to a similar suspension 1808', mount 1810' and arm 1812'. As shown, the through-hole spring 1873' of mount 1810', and the associated aperture 1881' in the arm 1812', are offset from the locations of the corresponding spring 1873 and aperture 1881 in suspension 1808 and arm 1812, respectively. With the exception of these attachment structure location differences, suspension 1808', mount 1810' and arm 1812' can be identical to suspension 1808, mount 1810 and arm 1812, respectively. This complementary structure allows the arms 1812 and 1812' and suspensions 1808 and 1808' to be stacked adjacent to one another in a back-to-back relationship as shown in FIG. 29 without interference. As shown, the asymmetric arrangement of the side springs 1871 and 1871' on mounts 1810 and 1810' also enables the stacking without interference.

FIG. 30 is an illustration of a load beam 1941 having a snap-on mount 1910 in accordance with another embodiment of the invention, and an actuator arm 1912 to which the load beam can be attached. Mount 1910 is located on the mounting region 1947 of the load beam 1941 and includes a pair of proximally extending arms 1991 having engagement structures such as holes 1993 near their proximal ends. A spring tab 1995 extends out of the plane of the mounting region 1947 from each of arms 1991. In the illustrated embodiment, the spring tabs 1995 extend from the outer edges of the arms 1991, and have lips 1997 on their free ends. Actuator arm 1912 has an aperture 1999 with interior side walls 1901.

The spring tabs 1995 are shaped, sized and positioned to mate with and engage side walls 1901 of the aperture 1999 in the actuator arm 1912. During the mounting process, optional tooling (not shown) can engage the holes 1993 and be manipulated to move the arms 1991, and therefore the spring tabs 1995, toward one another against the resilient bias force of the arms. This action is performed to an extent that the spacing between the spring tabs 1995 is less than the distance between opposed aperture walls 1901, enabling the spring tabs to be more easily inserted into the aperture 1999. After the mount 1910 is inserted in this manner, the tooling (not shown), if used, can be released from the holes 1993, thereby allowing the resilient nature of the arms 1991 to bias the spring tabs 1995 into engagement with the aperture walls 1901. The lips 1997 on the spring tabs 1995 can be formed in a direction that caused them to extend over the edge of the aperture side walls 1901.

FIG. 31 is an illustration of a load beam 1941' having a mount 1910' in accordance with another embodiment of the invention. As shown, mount 1910' include spring tabs 1995' extending from arms 1991' that are spaced about a longitudinal axis of the load beam 1941' (i.e. are lengthwise spaced along the load beam). Holes 1993' are optionally engaged and manipulated against the bias force of the arms 1991' to move the spring tabs toward one another along the longitudinal axis for easier insertion into the aperture 1999 of arm 1912 (FIG. 30). Other than this orientation difference, mount 1910' is substantially similar, and functionally equivalent, to mount 1910 described above.

Figure 32:
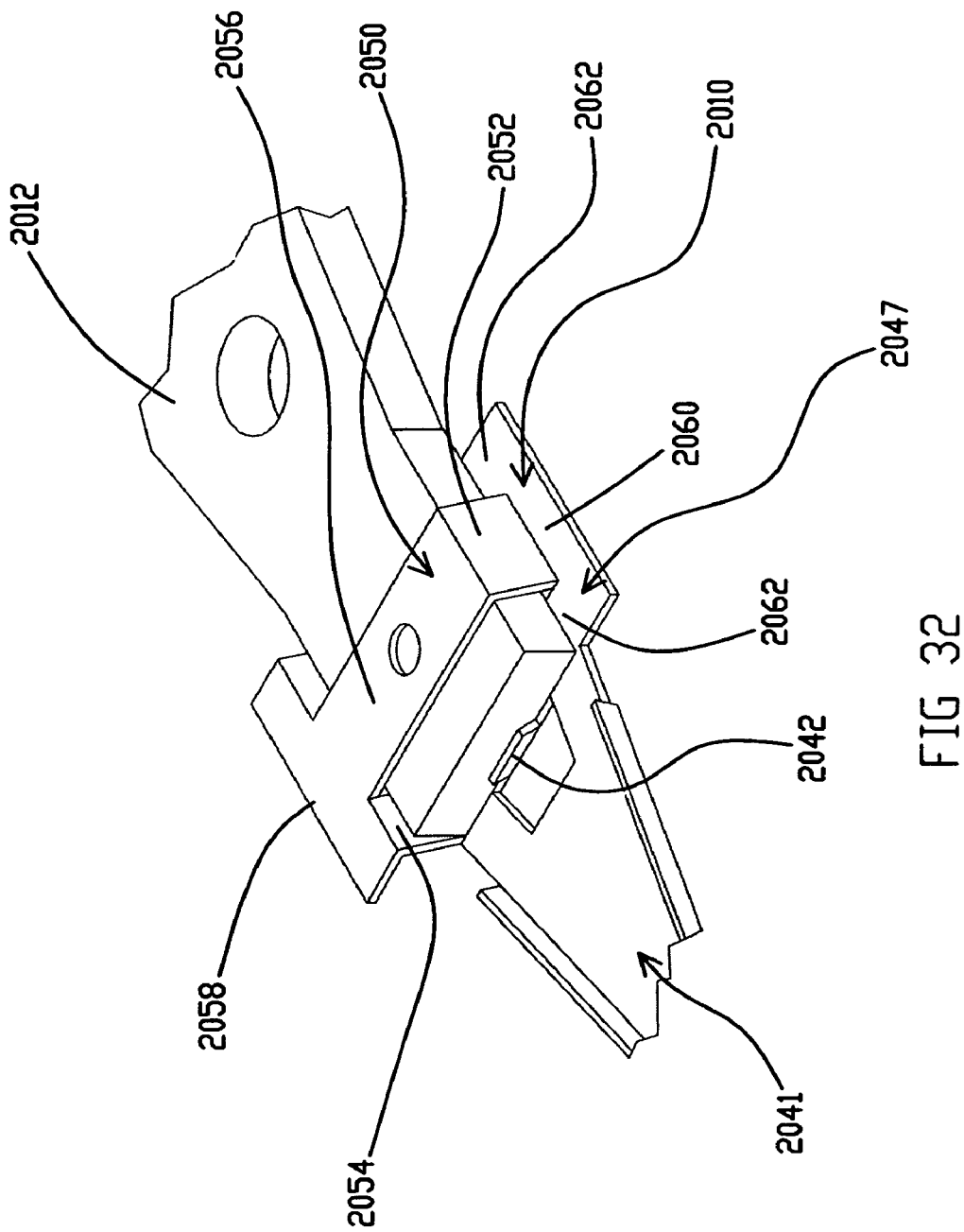
FIG. 32 is an illustration of a snap-on mount having a trapezoidal spring in accordance with another embodiment of the invention, attached to an actuator arm.

FIG. 32 is an illustration of a portion of a load beam 2041 having a trapezoidal spring snap-on mount 2010 in accordance with another embodiment of the invention mounted to an actuator arm 2012. Mount 2010 is formed on the mounting region 2047 of the load beam 2041 and includes a generally tubular-shaped trapezoidal spring 2050 having first and second opposing side walls 2052 and 2054 that extend out of the plane of mounting region 2047, and a top wall 2056 that extends between the side walls and is generally parallel to the mounting region. A portion of the top wall 2056 extends beyond the side wall 2054 to form a wing 2058. The mounting region 2047 extends beyond the side wall 2052 to form a wing 2060. Although not visible in FIG. 32, the side wall 2052 and top wall 2056 are formed from material in the mounting region 2047, thereby leaving a gap in the mounting region bounded by transversely extending sections 2062. A stop member 2042 is formed out of the plane of the mounting region 2047 at the distal edge of the mounting region.

Figure 33A:
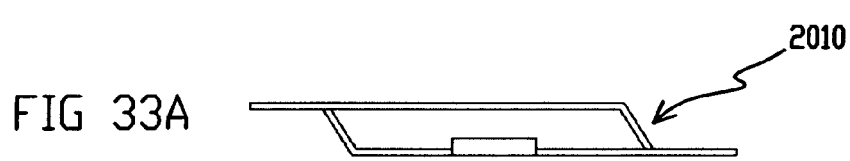
FIGS. 33A-33C are a series of sectional views of the trapezoidal spring shown in FIG. 32 illustrating the spring in unloaded, loaded and loaded, arm-engaging states, respectively.
Figure 33B:
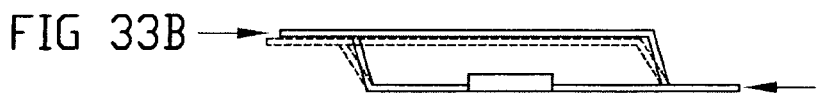
Figure 33C:
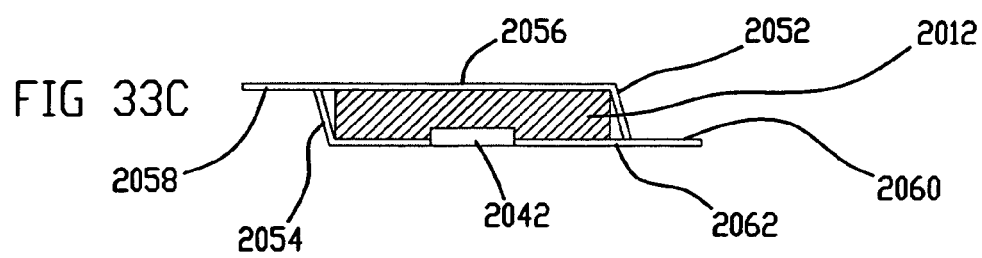

The manner by which actuator arm 2012 is attached to mount 2010 can be described with reference to FIGS. 33A-33C. FIG. 33A is an end view of the trapezoidal spring 2050 in its unloaded or free state. The trapezoidal spring 2050 is shaped and sized so that the distance between the top wall 2056 and the sections 2062 of the mounting region 2047 is less than the thickness of the arm 2012 that is to be attached to the mount 2010. To attach the mount 2010 to the arm 2012, a compressive force is applied between the top wall 2056 and mounting region sections 2062 to force the spring 2050 into a loaded state at which its shape will move away from the trapezoid shape shown in FIG. 33A toward a more rectangular shape shown in FIG. 33B. The compressive forces can be applied to the spring 2050 through the wings 2058 and 2060 as indicated in FIG. 33B. When in the loaded state, the size and shape of spring 2056 is configured to receive the actuator arm 2012. After the actuator arm 2012 is inserted and positioned (e.g. against stop 2042), the compressive force on the spring 2050 is released, allowing the spring to move toward its free state. However, spring 2050 is sized and shaped so that the top wall 2056 and mounting region sections 2062, and in some embodiments at least portions of side walls 2052 and 2054 will engage the actuator arm 2012 before the spring returns fully to its free state. The spring 2050 thereby provides a bias force that securely, yet releasably, engages the arm and attached the arm to the load beam 2041.

Figure 34:
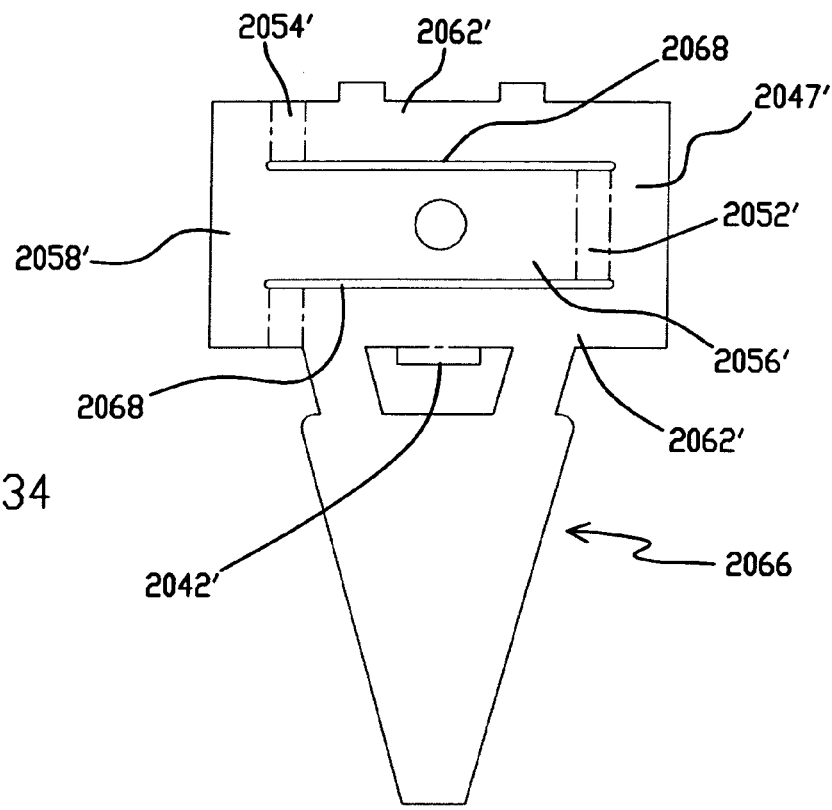
FIG. 34 is an illustration of a material blank from which the snap-on mount shown in FIG. 32 can be formed.

Load beam 2041 and mount 2010 can be fabricated as a one-piece member from stainless steel. FIG. 34 is an illustration of a flat blank 2066 of sheet material from which the load beam 2041 and mount 2010 can be formed. Portions of blank 2066 are identified by reference numbers similar to those of the corresponding structures in load beam 2041 and mount 2010. As shown, the blank 2066 includes a pair of parallel and transversely-extending slots 2068 in the mounting region portion 2047' of the blank. The blank 2066 shown in FIG. 34 can be manufactured by photolithography and etching processes. Alternatively, other conventional or otherwise known methods can be used to manufacture the blank 2066. Conventional or otherwise known forming processes can be used to form the load beam 2041 and mount 2010 from the blank 2066. In alternative embodiments (not shown) the mount 2010 is formed as a separate member and attached to a load beam, hinge or other suspension component.

FIG. 35 is an illustration of a portion of a load beam 2141 having a clip snap-on mount 2110 in accordance with another embodiment of the invention mounted to an actuator arm 2112. Mount 2110 has a first or clamp member 2169 formed on the mounting region 2147 of the load beam 2141. Clamp member 2169 includes side walls 2170 having clip-engaging rails 2172 on their upper edges. As shown, the rails 2172 are generally U-shaped members that open sideways, away from one another. In the illustrated embodiment, the rails 2172 are located at a position that places them on the major surface of the arm 2112 to which the mount 2110 is to be engaged. In other embodiments (not shown) the rails 2172 are located above or below the surface of the arm 2112 to which the mount 2110 is to be attached. Although the clamp member 2169 is shown as an integral member of the load beam 2141 in the illustrated embodiment, it is formed as a separate member and welded or otherwise attached to the mounting region, hinge or other suspension component in other embodiments (not shown).

Mount 2110 also includes a clip 2174 that is configured to engage the clamp member 2169, and to pull the rails 2172 toward one another and thereby cause the side walls 2170, rails 2172 and mounting region 2147 of the suspension to engage and grip the actuator arm 2112. In the illustrated embodiment, clip 2174 is a plate having inwardly-oriented rails 2176 on its outer edges. The rails 2176 are shaped and positioned in such a manner that they can enter the U-shaped rails 2172 on the clamp member 2169. When the clip 2174 is slid into the clamp member 2169 it causes the clamp member to engage the actuator arm 2112 in the manner described above. The leading edges 2178 of the rails 2176 of clip 2174 can be tapered to provide a lead-in surface that facilitates the insertion of the clip into the clamp member 2169. Stop 2180 on the trailing end of clip 2174 will engage the arm 2112 when the arm and clip are properly and completely assembled. FIG. 35 is an end view showing the assembled clamp member 2169 and clip 2174.

FIG. 37 is an illustration of a load beam 2241 having a clip snap-on mount 2210 in accordance with another embodiment of the invention. Mount 2210 has a clamp member 2267 formed on the mounting region 2247 of the load beam 2241. Clamp member 2267 includes side walls 2271 having tab-engaging slots 2273 on their upper edges. Although the clamp member 2267 is shown as an integral member of the load beam 2241 in the illustrated embodiment, it is formed as a separate member and welded or otherwise attached to the mounting region, hinge or other suspension component in other embodiments (not shown).

Mount 2210 also includes a clip 2274 that is configured to engage the clamp member 2267. In the illustrated embodiment, clip 2274 includes a plate 2277 having tabs 2279 extending from its side edges and one or more (two are shown) dimples 2281 extending from the plane of the plate 2277 toward the mounting region 2247. Other embodiments (not shown) have bosses or other protrusions as alternatives to dimples 2281. The clamp member 2267 and clip 2274 are sized and shaped to enable the clip tabs 2279 to be inserted into the clamp member slots 2273. Clip 2274 is thereby releasably yet securely engaged by the clamp member 2267. Although not shown in FIG. 37, the slots 2273 in the clamp member 2267 can be dimensionally larger along an axis out of the plane of the mounting region 2247 than the thickness of the clip tabs 2279 to enable movement of the clip plate 2277 toward and away from the mounting region while the clip remains entrapped by the clamp member.

As shown in FIG. 38, mount 2210 is configured to be mounted to an actuator arm 2212 having recesses or apertures 2283 that correspond to the locations of the dimples 2281 when the mount is properly located on the arm. Mount 2210 is sized so that when it is slid onto actuator arm 2212 there will be a friction fit engagement between the mount and arm, and dimples 2281 will snap into the apertures 2283 to properly locate the arm. Although two sets of dimples 2281 and apertures 2283 are shown in the illustrated embodiment, other embodiments (not shown) have one or more than two sets of dimples and apertures.

Figure 39:
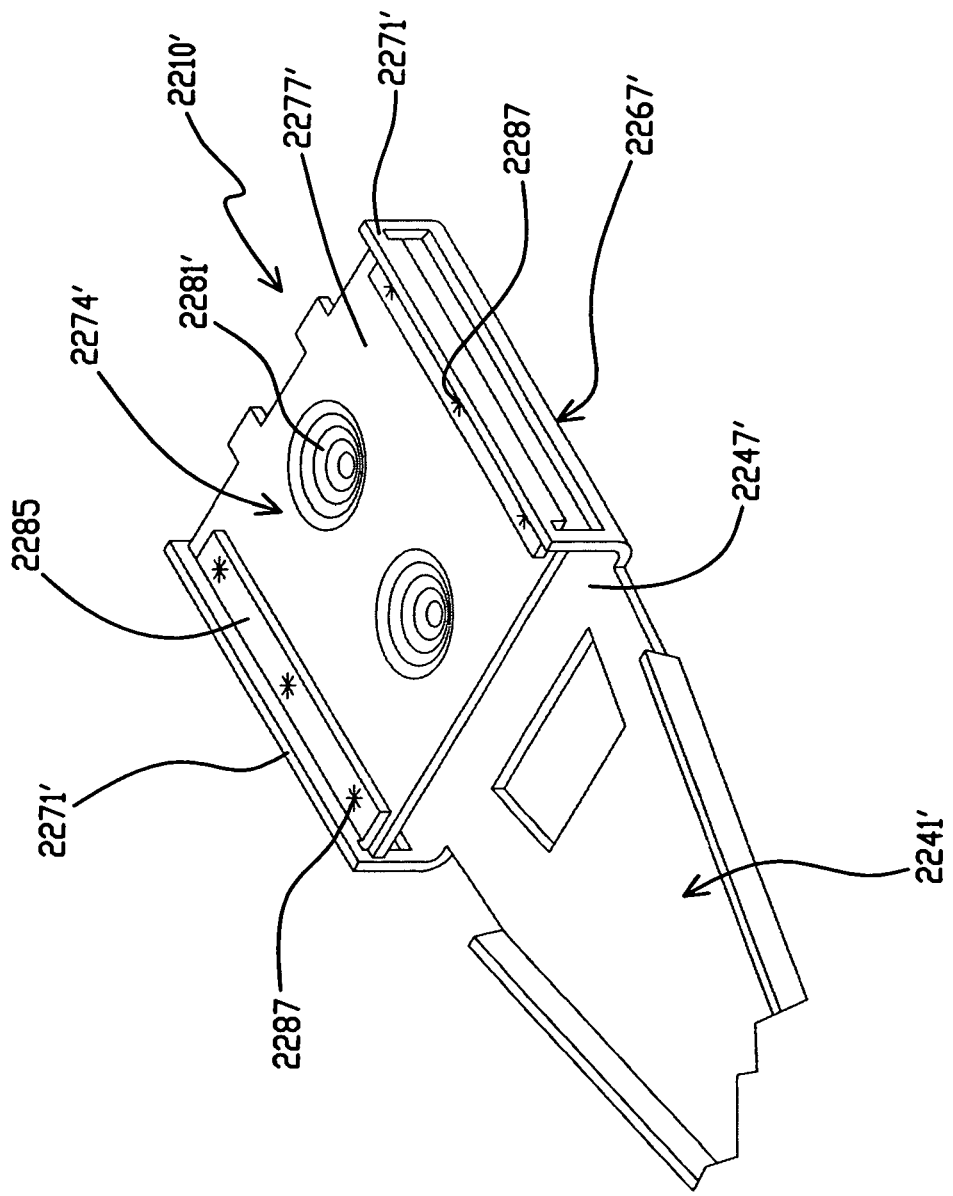
FIG. 39 is an illustration of an alternative embodiment of the mount shown in FIG. 37.

Still other embodiments of the invention include other structures for securing the clip to the clamp member in mounts such as 2210. FIG. 39, for example, illustrates a mount 2210' having a clamp member 2267' with lips 2285 formed in the side walls 2271'. The edges of clip plate 2277' can be attached to the lips 2285 by welds 2287 or other conventional or known structures or methods. With the exception of the above described structures for attaching the clip 2274' to clamp member 2267', mount 2210' can be substantially identical in form, function and operation to mount 2210 described above, and similar features are identified by similar reference numbers.

In summary, the invention is an easily reworked disk drive suspension that "snaps" around the outside of an E-block or other actuator arm (i.e., has a spring force creating a friction fit to the actuator arm). Preferred embodiments of the suspension are used in single platter drives where there would be no section of the E-block arm that has two suspensions on it (or where there at most two suspensions). The conventional base plate region of the suspension can have two C-shaped spring clips formed on each side of the region to create a gap that is shorter than the thickness of the E-block arm. When the E-block arm is slid into this gap, the spring clips deflect and create a force that holds the suspension to the E-block. Additional features of the invention can enhance the gripping force, limit movement of the part relative to the E-block, or better locate the suspension relative to the E-block. By way of example, formed features such as hard stop rails at the front of the part can be used for location, and a dab of adhesive under the E-block after DET testing can permanently secure the suspension.

The configuration of the invention can be optimized to meet a variety of design parameters or customer requirements. In one preferred embodiment the snap-on part of the suspension is formed from the same material as the load beam. The need for a base plate component can, but need not be, eliminated with this embodiment. If the spring clips are made from thin material, they can deflect relatively further to generate the same clamping force as springs formed from relatively thicker material. Since lower deflection is generally desirable (e.g., to limit part damage) the invention is well suited for multipiece designs where the load beam material is thicker (e.g., 4 mil). The invention can be used with steel as thin as the stainless steel used in the flexure portion of a suspension (e.g., in a one-piece ISG-type load beam). The spring clips can also be made as a separate component, thereby enabling the load beam to be a different material or thickness. In this configuration, the snap-on piece can still be an etched component, which enables it to be fed on a strip through assembly.

The invention can be made and used without modifications or special features on the E-block arm. Locating features can also be incorporated into the device. The invention can be relatively easily reworked, at least in part because it allows the suspension to be slid off or otherwise removed from the actuator arm, and another one slid on. These actions can be accomplished without damage to the E-block or special processing steps. The invention can also be used with swageable suspensions and extended-mounting region (i.e., unamount) arms.

Advantages of the invention include the possible elimination of the need for base plates, thereby lowering the cost of the suspension. HSA companies can also eliminate the need to perform the swaging process and enable easy rework.

The invention can be produced by processes that are the same or similar to those used for conventional products.

Stamped E-blocks with which the invention can be used can be generally rectangular and relatively thick structures. In one embodiment, the only features in the E-block are those that can be stamped vertically into the structure. These stamped features are preferably relatively simple geometrically, and include, for example, round holes, slots and rectangles. These features will generally pass through the full thickness of the arm, but recesses are possible. Preferred embodiments will not have side grooves or side holes or recesses.

The invention can be incorporated into so-called one-piece designs (integrated flexure load beam where the spring is made from the stainless steel layer of the laminate), two-piece designs (having a separate load beam and flexure, with the spring made from the load beam material), and three-piece designs (where there is a flexure, hinge and load beam/load beam stiffener, and the spring is formed from the load beam stiffener material).

Although the present invention has been described with reference to preferred embodiments, those skilled in the art will recognize that changes can be made in form and detail without departing from the spirit and scope of the invention.

What is claimed is:

1. A mount for attaching a disk drive suspension assembly to an actuator arm, comprising:
    a base region;
    a resilient spring clip extending from the base region, the spring clip biased with respect to the base region to engage an aperture in the actuator arm; and
    a plurality of resilient side springs extending from opposite sides of the base region, the side springs biased with respect to the base region to engage the actuator arm.

2. The mount of claim 1, wherein the mount is integral with a portion of the disk drive suspension assembly.

3. The mount of claim 1, wherein the mount further comprises one or more stop members extending from a distal area of the base region, for engaging the actuator arm.

4. The mount of claim 1, wherein the spring clip includes a pair of legs that diverge from one another with increasing distance from the base region.

5. The mount of claim 4, wherein the legs have free ends with lips.

6. The mount of claim 1, wherein the spring clip is sized to extend through the aperture in the actuator arm.

7. The mount of claim 1, wherein the side springs are configured to engage side edges of the actuator arm.

* * * * *